US012762589B2

(12) United States Patent
(10) Patent No.: US 12,762,589 B2
(45) **Date of Patent: *Oct. 13, 2026**

Levy et al.

(54) DISTRIBUTED CONTENT SERVING

(71) Applicant: Anagog Ltd., Tel Aviv (IL)

(72) Inventors: Gil Levy, Rehovot (IL); Tomer Radian, Lapid (IL)

(73) Assignee: ANAGOG LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 19/000,378

(22) Filed: Dec. 23, 2024

(65) Prior Publication Data

US 2025/0131475 A1 Apr. 24, 2025

Related U.S. Application Data

(63) Continuation of application No. 17/759,524, filed as application No. PCT/IL2021/050126 on Feb. 3, 2021, now Pat. No. 12,205,148.

(Continued)

(51) Int. Cl.
*G06Q 30/00* (2023.01)
*G06Q 30/0251* (2023.01)

(52) U.S. Cl.
CPC ................................ *G06Q 30/0269* (2013.01)

(58) Field of Classification Search
CPC ........... G06Q 30/0269; G06Q 30/0201; G06Q 30/0251; H04W 12/08; H04W 12/63; H04W 12/68; H04W 12/06
See application file for complete search history.

(56) References Cited

U.S. PATENT DOCUMENTS 8,543,518 B2 * 9/2013 Verma ................ G06Q 30/0277 706/12
9,280,785 B1 * 3/2016 Jain .................... G06Q 30/0243
(Continued)

FOREIGN PATENT DOCUMENTS

GB 2468349 A * 9/2010 ............. G06F 21/88
JP 2018524659 A * 8/2018 ........... H04L 63/068
(Continued)

OTHER PUBLICATIONS

James Ewen. "How Big Data & Location Intelligence Are Changing the World." (Mar. 5, 2018). Retrieved online Feb. 14, 2024. https://www.freecodecamp.org/news/how-big-data-location-intelligence-is-changing-the-world-181ef8bf097f/ (Year: 2018).*
(Continued)

*Primary Examiner* — James A Reagan

(57) ABSTRACT

A method, system and product including obtaining offline user information at an end device, wherein the offline user information is obtained from offline sensors of the end device; based on the offline user information, generating a user profile indicating that a user of the end device matches at least one micro-segment, wherein the at least one micro-segment comprises at least one detailed population category; based on the at least one micro-segment, selecting a campaign from a set of one or more campaigns retained at a server, wherein the campaign comprises one or more rules for displaying at least one content item; monitoring the offline sensors of the end device to identify real time user activities; and upon identifying, based on the real time user activities, that a rule of the one or more rules for displaying a content item is complied with, displaying the content item in the end device.

19 Claims, 16 Drawing Sheets

Related U.S. Application Data

(60) Provisional application No. 62/969,237, filed on Feb. 3, 2020.

(56) References Cited

U.S. PATENT DOCUMENTS

| | | | | |
|---|---|---|---|---|
| 9,456,308 | B2 * | 9/2016 | Assuncao | H04M 1/72454 |
| 9,785,972 | B2 * | 10/2017 | Raman | G06Q 30/0267 |
| 10,504,154 | B1 * | 12/2019 | Bonawitz | G06N 20/00 |
| 10,726,438 | B2 * | 7/2020 | Vangala | G06Q 30/0224 |
| 11,176,572 | B2 * | 11/2021 | Avedissian | H04N 21/41415 |
| 11,244,354 | B2 * | 2/2022 | Deshpande | G06Q 30/0267 |
| 11,301,859 | B2 * | 4/2022 | Jajara | G06Q 20/322 |
| 11,775,985 | B2 * | 10/2023 | Abdelsamie | G06Q 30/018 705/317 |
| 2008/0004884 | A1 * | 1/2008 | Flake | G06Q 30/02 705/1.1 |
| 2008/0040216 | A1 * | 2/2008 | Dellovo | G06Q 30/0277 705/14.44 |
| 2008/0235088 | A1 * | 9/2008 | Weyer | G06Q 30/02 705/14.54 |
| 2008/0270233 | A1 * | 10/2008 | Yip | G06Q 30/0277 705/14.54 |
| 2009/0011740 | A1 * | 1/2009 | Aggarwal | H04L 67/306 455/414.3 |
| 2009/0024546 | A1 * | 1/2009 | Ficcaglia | G06Q 30/02 706/46 |
| 2009/0197582 | A1 * | 8/2009 | Lewis | H04L 67/55 455/414.2 |
| 2010/0262456 | A1 * | 10/2010 | Feng | G06Q 30/02 705/14.66 |
| 2011/0161462 | A1 * | 6/2011 | Hussain | H04L 69/329 709/219 |
| 2011/0231243 | A1 * | 9/2011 | Bhatia | G06Q 30/0255 705/14.43 |
| 2011/0231244 | A1 * | 9/2011 | Bhatia | G06Q 30/02 705/14.43 |
| 2011/0231245 | A1 * | 9/2011 | Bhatia | G06Q 30/02 705/14.43 |
| 2013/0124269 | A1 * | 5/2013 | Dunning | G06Q 10/06393 705/7.39 |
| 2013/0151343 | A1 * | 6/2013 | Phan | G06Q 30/02 455/414.1 |
| 2013/0151405 | A1 * | 6/2013 | Head | G06Q 20/322 705/41 |
| 2013/0191213 | A1 * | 7/2013 | Beck | G06Q 30/0207 705/14.64 |
| 2013/0262225 | A1 * | 10/2013 | Ahrens | G06Q 30/0243 705/14.58 |
| 2014/0237496 | A1 * | 8/2014 | Julian | G06Q 30/02 725/13 |
| 2014/0278260 | A1 * | 9/2014 | Gettings | G06F 11/3089 702/189 |
| 2014/0280896 | A1 * | 9/2014 | Papakostas | H04W 4/50 709/224 |
| 2014/0357247 | A1 * | 12/2014 | Assuncao | H04M 1/72454 455/418 |
| 2015/0339696 | A1 * | 11/2015 | Zhou | G06Q 20/322 705/14.23 |
| 2015/0339729 | A1 * | 11/2015 | Mahajan | G06Q 30/0264 705/14.71 |
| 2015/0348119 | A1 * | 12/2015 | Ferber | G06Q 30/0269 705/14.66 |
| 2016/0042399 | A1 * | 2/2016 | Deshpande | G06Q 30/0267 705/14.64 |
| 2017/0068982 | A1 * | 3/2017 | Vangala | G06Q 30/0224 |
| 2017/0094018 | A1 * | 3/2017 | Ekström | G08B 13/00 |
| 2017/0140419 | A1 * | 5/2017 | Mannix | G06Q 30/0251 |
| 2017/0228766 | A1 * | 8/2017 | Mahajan | G06Q 30/0275 |
| 2017/0228784 | A1 * | 8/2017 | Singh | H04L 67/52 |
| 2018/0350144 | A1 * | 12/2018 | Rathod | G06Q 20/3224 |
| 2019/0012701 | A1 * | 1/2019 | Mannix | G06Q 30/0205 |
| 2019/0156231 | A1 * | 5/2019 | Gupta | G06N 3/08 |
| 2019/0245635 | A1 * | 8/2019 | Verkasalo | H04H 60/58 |
| 2019/0370854 | A1 * | 12/2019 | Gao | H04W 4/21 |
| 2020/0005354 | A1 * | 1/2020 | Gupta | G06N 20/00 |
| 2020/0027088 | A1 * | 1/2020 | Jajara | G06Q 20/322 |
| 2020/0027121 | A1 * | 1/2020 | Avedissian | G06T 1/0021 |
| 2020/0410553 | A1 * | 12/2020 | Watson | G06N 20/00 |
| 2021/0256536 | A1 * | 8/2021 | Abdelsamie | G06Q 30/018 |
| 2021/0330777 | A1 * | 10/2021 | He | A61K 47/646 |
| 2022/0179665 | A1 * | 6/2022 | Rathod | G06F 9/451 |
| 2023/0394495 | A1 * | 12/2023 | Abdelsamie | G06Q 30/018 |

FOREIGN PATENT DOCUMENTS

| | | | | |
|---|---|---|---|---|
| JP | 2019091134 A | * | 6/2019 | G06N 5/02 |
| WO | WO-2011043842 A1 | * | 4/2011 | G06F 17/30035 |
| WO | WO-2021156861 A1 | * | 8/2021 | G06Q 30/0251 |

OTHER PUBLICATIONS

Houda Najeh et al. “Dynamic Segmentation of Sensor Events for Real-Time Human Activity Recognition in a Smart Home Context.” (Jul. 21, 2022). Retrieved online Feb. 14, 2024. https://www.mdpi.com/1424-8220/22/14/5458 (Year: 2022).*

Muhammad Ehatisham-ul-Haq et al. “Authentication of Smartphone Users Based on Activity Recognition and Mobile Sensing.” (Sep. 6, 2017). Retrieved online Feb. 14, 2024. https://www.mdpi.com/1424-8220/17/9/2043 (Year: 2017).*

* cited by examiner

DISTRIBUTED CONTENT SERVING

CROSS-REFERENCE TO RELATED APPLICATION

This application claims the benefit of Provisional Patent Application No. 62/969,237, titled "Privacy-Preserving Data Analytics And Content Serving" filed Feb. 3, 2020, which is hereby incorporated by reference in its entirety without giving rise to disavowment.

TECHNICAL FIELD

The present disclosure relates to distributing content serving in general, and to methods, products, and systems for distributing content serving capabilities to the end devices, in particular.

BACKGROUND

Mobile computerized devices have become a necessity which most people in the developed and developing world count on and use for almost any purpose, including but not limited to reading electronic-mails, communicating with friends and business associates using social networks, keeping their calendar, navigating, shopping, listening to music, watching videos and many other activities. Thus, a mobile device of a typical user retains significant information about its user and the user's habits, activities, locations in which the user was present, searches the user performed, items the user bought or intends to buy, contacts of the user, and a lot of additional information of multiple types.

Many users are justly worried about loss of their privacy, due to some of the information being provided to entities, such as commercial companies, financial institutes, governmental organizations or the like. Some private information may pose a nuisance to a user if leaked to a commercial company, while other information, such as visited locations, can seriously jeopardize aspects of the user's life, such as the user's family, work, or others.

BRIEF SUMMARY

One exemplary embodiment of the disclosed subject matter is a method comprising: obtaining offline user information at an end device, wherein the offline user information is obtained from offline sensors of the end device; based on the offline user information, generating, at the end device, a user profile, wherein the user profile indicates that a user of the end device matches at least one micro-segment, wherein the at least one micro-segment comprises at least one detailed population category that describes the user; based on the at least one micro-segment, selecting a campaign from a set of one or more campaigns retained at a server, wherein the campaign comprises one or more rules for displaying at least one content item, wherein said selecting is performed by the end device; monitoring, at the end device, the offline sensors of the end device to identify real time user activities; and upon identifying, based on the real time user activities, that a rule of the one or more rules for displaying a content item is complied with, displaying the content item in the end device.

Optionally, the method comprises monitoring, at the end device, one or more interactions of the user with served content items of the campaign; computing, at the end device, a count of interactions of each interaction type between the user and the served content items; and providing the count of interactions of each interaction type to the server.

Optionally, said monitoring the one or more interactions comprises obtaining an indication of the one or more interactions from a host application of the end device that displays the content item.

Optionally, said monitoring the one or more interactions comprises: monitoring a background and a foreground of the end device, and determining that an interaction of the one or more interactions has occurred based on identifying that a notification presenting the content item is in a foreground of the end device.

Optionally, said displaying the content item in the end device comprises instructing a host application to display the content item.

Optionally, the one or more rules for displaying the at least one content item comprise at least one micro-moment, wherein the at least one content item is configured to be displayed during a micro-moment of the at least one micro-moment.

Optionally, the micro-moment corresponds to one or more activities of the user identified by said monitoring.

Optionally, the micro-moment corresponds to one or more activities of the user identified when the user is not interacting with the end device, whereby content serving is triggered when the user is not interacting with the end device.

Optionally, the method comprises triggering content serving when the user is not interacting with the end device.

Optionally, the method comprises modifying a delivery of the content item based on the real time user activities.

Optionally, the method comprises obtaining profile information of the user from a third party, and generating the user profile based on the profile information.

Optionally, the method comprises obtaining an identifier of the profile information from a host application of the end device, and utilizing the identifier to extract the profile information from the third party.

Optionally, the method comprises obtaining online user information of the user, wherein the online information comprises user communications that utilize a network medium, and generating the user profile based on the online user information.

Optionally, the offline sensors comprise a location sensor; a camera; a gyroscope; a proximity sensor; an ambient light sensor; a microphone; an accelerometer, or the like.

Another exemplary embodiment of the disclosed subject matter is system comprising a processor and coupled memory, the processor being adapted to: obtain offline user information at an end device, wherein the offline user information is obtained from offline sensors of the end device; based on the offline user information, generate, at the end device, a user profile, wherein the user profile indicates that a user of the end device matches at least one micro-segment, wherein the at least one micro-segment comprises at least one detailed population category that describes the user; based on the at least one micro-segment, select a campaign from a set of one or more campaigns retained at a server, wherein the campaign comprises one or more rules for displaying at least one content item, wherein said selecting is performed by the end device; monitor, at the end device, the offline sensors of the end device to identify real time user activities; and upon identifying, based on the real time user activities, that a rule of the one or more rules for displaying a content item is complied with, display the content item in the end device.

Yet another exemplary embodiment of the disclosed subject matter is a computer program product comprising a non-transitory computer readable storage medium retaining program instructions, which program instructions when read by a processor, cause the processor to: obtain offline user information at an end device, wherein the offline user information is obtained from offline sensors of the end device; based on the offline user information, generate, at the end device, a user profile, wherein the user profile indicates that a user of the end device matches at least one micro-segment, wherein the at least one micro-segment comprises at least one detailed population category that describes the user; based on the at least one micro-segment, select a campaign from a set of one or more campaigns retained at a server, wherein the campaign comprises one or more rules for displaying at least one content item, wherein said selecting is performed by the end device; monitor, at the end device, the offline sensors of the end device to identify real time user activities; and upon identifying, based on the real time user activities, that a rule of the one or more rules for displaying a content item is complied with, display the content item in the end device.

One exemplary embodiment of the disclosed subject matter is a method comprising: generating a campaign to target at least one micro-segment, wherein the at least one micro-segment comprises at least one population category, wherein compliance with the at least one micro-segment can be identified by an end device based on offline user information from offline sensors of the end device; generating the campaign to present content items to a plurality of end devices during one or more micro-moments defined by one or more rules, wherein the one or more micro-moments correspond to one or more user activities, wherein the one or more micro-moments can be identified by the end device based on the offline user information from the offline sensors; receiving a campaign request from the end device, wherein the campaign request requests the campaign; providing at least a portion of the campaign to the end device; and obtaining from the end device an indication of a micro-moment of the one or more micro-moments during which a content item was presented in the end device, and a corresponding user interaction to the content item.

Optionally, the method comprises generating the campaign to target, during an initial stage, one or more random micro-segments, and generating the campaign to target the at least one micro-segment based on results of the initial stage.

Optionally, the compliance with the at least one micro-segment is identified based on accumulated micro-moments accumulated at the end device.

Optionally, the one or more activities are configured to identified by the end device when a user of the end device is not interacting with the end device.

Optionally, said generating the campaign to present the content items to the plurality of end devices is configured to trigger content serving at the plurality of end devices when users of the plurality of end devices are not interacting with the plurality of end devices, respectively.

Optionally, the one or more micro-moments can be identified by the end device based on online user information of a user of the end device, wherein the online information comprises user communications that utilize a network medium.

Optionally, compliance with the at least one micro-segment of the end device cannot be identified outside the end device.

Another exemplary embodiment of the disclosed subject matter is system comprising a processor and coupled memory, the processor being adapted to: generate a campaign to target at least one micro-segment, wherein the at least one micro-segment comprises at least one population category, wherein compliance with the at least one micro-segment can be identified by an end device based on offline user information from offline sensors of the end device; generate the campaign to present content items to a plurality of end devices during one or more micro-moments defined by one or more rules, wherein the one or more micro-moments correspond to one or more user activities, wherein the one or more micro-moments can be identified by the end device based on the offline user information from the offline sensors; receive a campaign request from the end device, wherein the campaign request requests the campaign; provide at least a portion of the campaign to the end device; and obtain from the end device an indication of a micro-moment of the one or more micro-moments during which a content item was presented in the end device, and a corresponding user interaction to the content item.

Yet another exemplary embodiment of the disclosed subject matter is a computer program product comprising a non-transitory computer readable storage medium retaining program instructions, which program instructions when read by a processor, cause the processor to: generate a campaign to target at least one micro-segment, wherein the at least one micro-segment comprises at least one population category, wherein compliance with the at least one micro-segment can be identified by an end device based on offline user information from offline sensors of the end device; generate the campaign to present content items to a plurality of end devices during one or more micro-moments defined by one or more rules, wherein the one or more micro-moments correspond to one or more user activities, wherein the one or more micro-moments can be identified by the end device based on the offline user information from the offline sensors; receive a campaign request from the end device, wherein the campaign request requests the campaign; provide at least a portion of the campaign to the end device; and obtain from the end device an indication of a micro-moment of the one or more micro-moments during which a content item was presented in the end device, and a corresponding user interaction to the content item.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
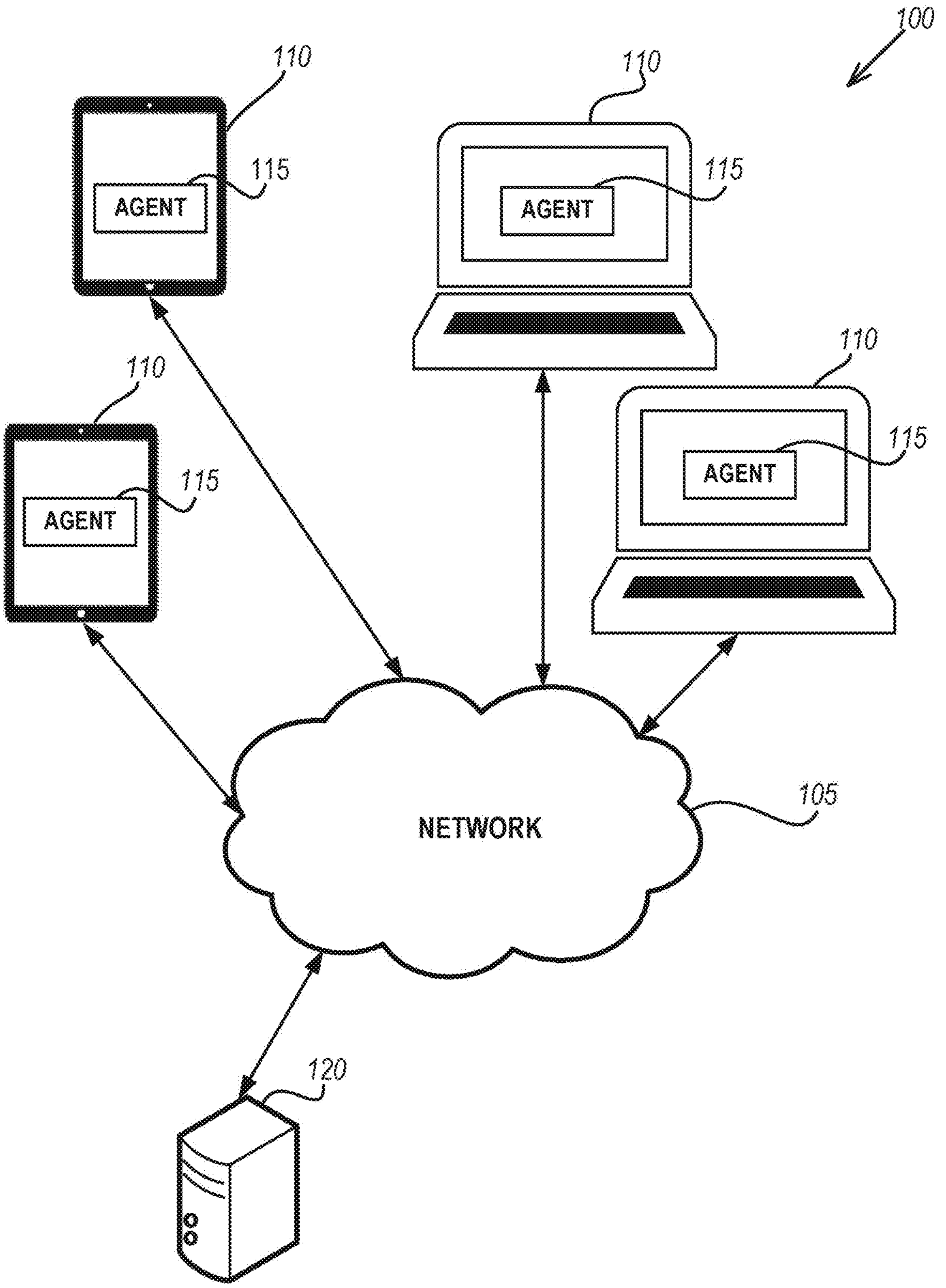
FIG. 1 shows a schematic illustration of an exemplary environment and architecture in which the disclosed subject matter may be utilized, in accordance with some exemplary embodiments of the disclosed subject matter.

One technical problem dealt with by the disclosed subject matter is enabling a campaign provider to obtain statistical information regarding a success of a campaign, without being privy to identifying information of any end user. Thus, a campaign provider may desire to analyze aggregated data, in order to get insight to the users' activities and take actions such improving their services or personalization, without jeopardizing the users' privacy.

Another technical problem dealt with by the disclosed subject matter is retaining the privacy of a user using an end device, such that sensitive data that can be attributed to the user will not be provided to a third party.

Yet another technical problem dealt with by the disclosed subject matter is to enable a campaign provider to track, monitor and respond to user actions without any sensitive data of the user exiting the end device. In order to provide personalized content that is based on user activity, it may be necessary to track and monitor the user activities, which may consist of Personally identifiable information (PII) information. However, it may be desired to maintain the user's privacy.

Yet another technical problem dealt with by the disclosed subject matter is to accumulate information about end users' offline activities in the real world environment, e.g., including physical activities, home and office locations, places visited, or the like, while maintaining the user's privacy.

Yet another technical problem dealt with by the disclosed subject matter is to provide a user with content items of a campaign at a desired contextual time, even if the user is not interacting with her device. It may be desired to derive the desired contextual time from offline and/or online information of the user. The disclosed subject matter may not be limited to a specific type of content, and any content may be provided to the users as part of a campaign.

Yet another technical problem dealt with by the disclosed subject matter is to provide a user with personalized content items, such as advertisements, that match the user's location, real time activities and attributes. For example, it may be desired that a content item that is not relevant to a user will not be served to the user, while a content item that is relevant to a user will be served to the user. As another example, it may be desired that a content item will not be served to the user during a timeframe that is not appropriate for the user, while a content item will be served to the user during a timeframe that is appropriate for the user.

Yet another technical problem dealt with by the disclosed subject matter is utilizing third party profile information of a user to determine a user profile of a user of the user device.

In some exemplary embodiments, a client of a campaign provider may attempt to launch a campaign at a campaign providing entity, a server thereof, or the like (also referred to as the "server" or the "campaign provider"). In some exemplary embodiments, the campaign provider may utilize one or more Customer Relationship Management (CRM) systems, Marketing Automation (MA) systems, or the like, in order to define and generate one or more campaigns for the client. In some exemplary embodiments, the campaign provider may provide a platform for clients, enabling them to select to target one or more user segments. In some exemplary embodiments, the campaign provider may be configured to generate campaigns for a plurality of clients, each associated with one or more campaigns.

In some exemplary embodiments, a client may represent or consist of a firm that desired to develop a campaign, create a campaign, launch a campaign, distribute a campaign, or the like, using a host application associated with the firm, a host application associated with the campaign provider, a host application associated with a social network, or using any other distribution method such as electronic mails (e-mails), Short Message Service (SMS), or the like. For example, a client associated with ADOBE™ may generate a plurality of campaigns configured to promote content, promote products, or the like, via an ADOBE™ application, via a host application of the campaign provider, via FACEBOOK™, or the like. In some exemplary embodiments, a host application may comprise a script, a software, a browser extension, a mobile application, a web application, a Software Development Kit (SDK), a native mobile application, a website, a dedicated web application, a hybrid application, a generic mobile application, or the like. In some exemplary embodiments, a plurality of end users may utilize the application, such as by installing it to their end devices. In some exemplary embodiments, the client may desire to launch one or more campaigns via the host application or elsewhere. In some exemplary embodiments, the host application may enable other pieces of software to be executed therein, e.g., pieces of software provided by the campaign provider. Alternatively, campaigns may be launched without a host application, e.g., via SMS or e-mails.

In some exemplary embodiments, each campaign may have a unique campaign identifier (ID), which may uniquely identify the campaign at the campaign providing entity. In some exemplary embodiments, a campaign may be predefined to target certain user segments enabled by the campaign provider, may be configured by the campaign provider to select desired user segments automatically, a combination thereof, or the like. For example, a client may manually select one or more user segments from a set of user segments offered by the campaign provider, in case they seem relevant to his campaign in the client's opinion, or in any other case based on any other condition or decision. In some exemplary embodiments, the user segments available at the server may consist of one or more filters, rules, or categories of end users. In some exemplary embodiments, the client may select one or more rules distinguishing between end users, so that the campaign will be provided to end users of interest. In some cases, the campaign provider may have limited user segments that are available to target, such as user segments defined based on non-PII information of end device or user segments derived from online activities of end devices only.

Yet another technical problem dealt with by the disclosed subject matter is to utilize richer and sophisticated segment categories that may be based on PII information, without enabling the campaign provider to have access to the PII information so as to preserve the user's privacy. For example, it may be desired to utilize segment categories including timing parameters for displaying the content items, locations of end users, or the like.

One technical solution provided by the disclosed subject matter is distributing content serving of one or more campaigns to a plurality of end devices. In some exemplary embodiments, each end device may be enabled to select a matching campaign, and execute the campaign locally on the device in a personalized manner. In some exemplary embodiments, each end device may track, monitor and respond to actions of end users according to rules and configurations of the executed campaign, without exposing any real time user information to the server providing the campaign. It is noted that the disclosed subject matter allows end devices to perform a role of independent distributed content or advertising servers, by locally controlling the content item serving, timing thereof, or the like.

In some exemplary embodiments, a campaign may include content items such as text, images, or content of a notification to be presented to users of the end devices, media that is to be presented via a notification, rules defining a context for presenting the content, audience that is targeted by the campaign, rules defining a delivery method for delivering the content, binaries, manifest files, certificates, or the like. In some exemplary embodiments, in order to be able to utilize PII information of a user, the campaign provider may include one or more activity nodes in a campaign, each containing one or more executable rules that are to be executed by an end device only, instead of by the server. In some exemplary embodiments, the one or more activity nodes may be configured to apply the one or more executable rules in order to determine a timing for presenting the content items to the user, in order to determine a manner of presenting the content items to the user, in order to select a content item of the campaign that is to be presented, or the like. In some exemplary embodiments, content serving of the campaign may be performed based on the rules of the activity node that are executed on the end device, and the results of the content serving, e.g. the user interaction therewith, may be sent back to the MA backend of the client for further analysis. In some exemplary embodiments, the activity nodes may include one or more locally-executed nodes that may be executed locally on an end device. The campaign may define a sequence of activity nodes, each of which defining a rule to be examined. Upon a rule being held, the next node may be executed. In some cases, the sequence of nodes may comprise branching nodes, enabling a branching to different sub-sequences depending on conditions and evaluated expressions.

In some exemplary embodiments, the campaign provider may define in an activity node one or more PII-based rules, without having any PII information, e.g., by distributing the campaign to end devices and enabling the end devices to accumulate the required PII information and activating the node. In some exemplary embodiments, the PII-based rules or categories of a campaign may include one or more rules, filters, or the like, that require PII information, for example, location categories that target users that are located in a certain area of town, contexts, scopes, audiences, delivery methods, or the like. In some exemplary embodiments, a locally-executed activity node may define rules associated to a category of a user such as: if the user traveled more than three time a year to Europe in the past three years. In some exemplary embodiments, a locally-executed activity node may define rules associated to a context of a user such as: if the user is under 50 meters from work, if the user is walking, if the user is running, if the user is driving, if the user entered his home, or the like, then perform a content serving action. In some exemplary embodiments, the activity node may define rules that can be evaluated locally at the end device, with or without connectivity to a remote server.

In some exemplary embodiments, the activity nodes of the campaign may consist of offline related rules or conditions utilizing PII information, such as instructing the end device to perform a content serving action in response to an offline event such as in case the user is less than fifty meters away from a specific Point of Interest (POI), in case the user is performing a certain activity such as walking, running, or driving, in case the user is at a certain city, or the like. In some exemplary embodiments, the offline events may be identified based on monitored actions of the end users. In some exemplary embodiments, the activity node of the campaign may consist, in some cases, of online events utilizing PII information, such as rules instructing the end device to perform a content serving action in case of an online event is identified, such as in case the user received an email, opened an email, visited a certain web page, or the like. In some exemplary embodiments, activity nodes of the campaign may define an audience that is targeted based on offline events utilizing PII information, online events utilizing PII information, a combination thereof, or the like. For example, users that run more than an hour a day may be targeted, by utilizing PII location information to identify a pattern of running for a duration of more than an hour a day. In some cases, the activity node of the campaign may define rules configuring a text or content of a content item based on PII information, rules configuring a frequency of serving each content item, or the like. For example, the activity node may define that in case a user is located in Paris and just came home from work, he is to be presented with a modified content item via a notification that has a certain layout or content.

In some exemplary embodiments, the platform of the campaign providing entity may add options for utilizing the PII-based rules or categories, enabling clients to target user segments according to supplement categories including micro-segments, micro-moments, locations, delivery methods, contexts, or the like, e.g., without knowing which und users correspond to which categories. In some exemplary embodiments, micro-segments may define high-resolution detailed population categories such as a number of working hours a day of a user, a number of flights each year of a user, or the like. In some exemplary embodiments, micro-moments may define a timing or context of serving the content item to the user. For example, micro-moments may define that a content item is to be served to a user 15 minutes after returning home from work, not while driving, or the like.

In some exemplary embodiments, an administrative user of the client may generate a campaign, such as using a web-interface, an application, or the like. In some exemplary embodiments, the administrative user may select one or more micro-segments, micro-segments, locations, or the like, from the PII-based rules, in addition to or instead of non-PII rules, for which the campaign may be activated. In some cases, the administrative user may define a campaign to be activated for a specific micro-segment or a set of alternative micro-segments. Additionally or alternatively, the campaign may be defined to target users that are members of several combined micro-segments, during several combined micro-moments, or the like. Additionally or alternatively, the administrative user may utilize set operations to define the crowd for which the campaign may be activated.

In some exemplary embodiments, a campaign may be automated, by selecting attributes of user segments automatically using heuristics or classifiers. In some exemplary embodiments, definitions or configurations of a campaign may be created automatically, semi-automatically, or the like. In some exemplary embodiments, a client may determine the one or more rules or categories of the campaign manually, automatically, e.g., based on previous success rates of selected segments, or a combination thereof.

For example, in order to determine a campaign automatically, the client may configure the campaign to first target random segments, and then use result of the random segments to iteratively enhance the precision of the segments by adjusting the weights of the segment amounts. In some exemplary embodiments, at an initial stage, the campaign may be provided to a group of random end users at random times of the day, of the week, or the like. In some exemplary embodiments, the campaign may be presented to a random selection of micro-segments and micro-moments, and the pressing clients may be designated for further campaigns. In some exemplary embodiments, initial broad ranges of random micro-segments and micro-moments may be set by administrative user on the basis of domain knowledge, preliminary hypotheses, clustering of user population, or the like. In some exemplary embodiments, interaction results together with matching attributes may be analyzed, e.g., at the server, to determine which micro-segments and micro-moments were most effective statistically. In some exemplary embodiments, the effectiveness may be identified by comparing a rate difference between interactions of users that are associated and are not associated with a same attribute, micro-segment, micro-moment, or the like.

As another example, the client may manually select one or more initial segments that he expects to match the campaign, and then use results of the selected segments to iteratively enhance the precision of the selected segments by reducing a proportion of segments that had low interaction results, increasing a proportion of segments that had high interaction results, adjusting the weights of the segment amounts accordingly, or the like. In some exemplary embodiments, the results of the initial stage may be analyzed and utilized automatically according to one or more heuristics, manually by an administrative user reviewing the results, or the like.

In some exemplary embodiments, user segments that were more successful may be increased in quantity while user segments that were not popular may be decreased, e.g., automatically or manually. In some exemplary embodiments, the most significant segments may be automatically selected or increased in weight, quantity, or the like, or alternatively, the administrative user may be presented with results of most significant segments, and manually select segments for the further campaign, select weights therefore, or the like. For example, in case only people above age 20 pressed on a content item after taking a shower, the remaining campaign may be designated for a micro-segment defining a population segment aged above 20 in combination with a micro-moment of "after taking a shower". In some exemplary embodiments, a list of relevant micro-moments in which the interactions occurred, may be gathered, in addition to a number of interactions per micro-moment. The top micro-moments (e.g., top-10 or any other number) may be utilized as a triggering event for displaying the content of the campaign. Additionally, or alternatively, an administrative user may select micro-moments, e.g., using the list.

In some exemplary embodiments, a predictor may be trained at the server to predict a success rate of a segment, e.g., based on one or more previous results accumulated from end devices. In some exemplary embodiments, the predictor may be trained to identify relevant micro-moments in which the campaign is most effective based on a database of a plurality of user attributes and their interaction rates. Additionally, or alternatively, the predictor may be trained to predict an optimal micro-moment based on the micro-segments of a plurality of users and their interaction rates. In some exemplary embodiments, the trained module may be distributed to the mobile devices of the users and based on the trained module, an end device can locally determine whether to serve a content item to the user and at what micro-moments. The module may output a prediction of a user's interaction rate, and when the rate is above a threshold, a content item may be served. For example, when the prediction of the predictor is of at least 80% that an interaction would occur, a notification can be served to the user. In some exemplary embodiments, the trained predictor may be utilized at the server side, e.g., for selecting the most significant segments for a campaign, as predicted by the predictor.

In some exemplary embodiments, each end device may select a matching campaign from the server itself, according to metadata of each campaign. In some exemplary embodiments, upon determining a desired set of segments that is to be targeted by a campaign of a client, the campaign may be generated to be associated with the desired segments, e.g., by adding metadata thereto describing the associated segments, by linking it to the metadata, or by indicating the metadata in any other way. Alternatively, metadata of the segments may be retained separately from the campaign, e.g., indicating the associated campaign for the selected segments. In some exemplary embodiments, the server of the campaign provider may retain a database of campaigns associated with clients and their metadata, each of which may define a set of automated operations, such as automated serving of content items such as advertisements, an automated set of interactions and activations of Internet of Things (IoT) devices, or the like. In some exemplary embodiments, end devices may select a campaign or automated operations thereof based on the segments associated with the campaign.

In some exemplary embodiments, a plurality of end devices, e.g., a mobile device, a smartphone, a Personal Digital Assistant (PDA), a laptop, a tablet, Augmented Reality (AR) glasses, a wearable device, or the like, may or may not have an application installed and running thereon. In some exemplary embodiments, the end devices may have embedded therein a software module, e.g., in the application, in accordance with the disclosed subject matter. In some exemplary embodiments, the software module may comprise a Software Development Kit (SDK) with an Application Programming Interface (API). For simplicity and clarity, and without limiting the disclosed subject matter to such embodiment, the software module is referred to as an "agent". As one example, the application may be integrated with the agent that is configured to implement certain aspects of the disclosed subject matter. In some exemplary embodiments, the end device may comprise or otherwise be operatively coupled to sensors for sensing activity related to the users, such as but not limited to a gyroscope, a WIFI™ receiver, a BLUETOOTH™ receiver, charger connection, an accelerometer, a location sensor such as a Global Positioning System (GPS) receiver, a camera, a magnetometer, a proximity sensor, an ambient light sensor, a microphone, touchscreen sensors, a fingerprint sensor, a pedometer, a barometer, a thermometer, an air humidity sensor, or the like.

In some exemplary embodiments, the agent may be configured to identify and obtain offline user information of the end device, e.g., by monitoring offline sensors of the end device in real time. In some exemplary embodiments, the offline user information may be obtained at an end device hosting the agent. In some exemplary embodiments, the agent may obtain sensor readings over time and otherwise collect information about the user to determine real time activities of the user. In some exemplary embodiments, the offline user information may be obtained from offline sensors of the end device. In some exemplary embodiments, the offline user information may be processed to identify real world activities of the user that do not require a network connection such as driving, leaving work, or the like.

In some exemplary embodiments, the agent may be configured to accumulate additional user information regarding the user of the end device. In some exemplary embodiments, online user information of the user may be obtained, e.g., by the agent. In some exemplary embodiments, the online information may comprise user interactions with the end device or user communications that utilize a network medium, e.g., a Wide Area Network (WAN), a Local Area Network (LAN), a wireless network, the Internet, an intranet, or the like. In some exemplary embodiments, the agent may obtain online user information of the end device by monitoring online communications of the end device such as interactions with web-based applications of the end device, browser communications, interactions with internet pages, mobile applications, servers, cloud networks, or the like, e.g., in real time. In some exemplary embodiments, online user activities may include, for example, identifying that the user performed an action of "opening his email". In some exemplary embodiments, online behavior of the user may or may not be tracked, in addition tracking physical behavior of the user.

In some exemplary embodiments, the raw sensor information of the user may be processed, e.g., in order to identify patterns of activities, correlate between activities of the user and general known patterns, or the like. In some exemplary embodiments, a combination of different sensor outputs may be utilized in some cases to determine an activity of the user.

It is noted that the disclosed subject system does not merely derive data from online user interactions with websites, email campaigns, mobile applications, or financial transactions alone. The disclosed subject matter may provide supplement information about end users' offline activities-including physical activities, home and office locations, places visited, and more, which may be derived from offline sensors monitoring the end users.

In some exemplary embodiments, profile information of the user may be obtained from a third party, e.g., a client of the campaign provider. In some exemplary embodiments, the client or any other entity may derive user data from online user interactions with websites, email campaigns, mobile applications, and derive buying habit data such as a user's shopping cart or financial transactions via bank companies and credit card companies that have access to this information, which enables the client to select online criteria for segmenting the end users.

In some exemplary embodiments, in order to combine third party sources of user information with the agent's accumulated information, it may be necessary to correlate both sources to the same user. For example, a client may retain a database of user profiles that may not comprise identifying information enabling to identify the users, that can be used to determine which profile regards the user of the end device. In some exemplary embodiments, a unique user identifier may be utilized by third parties for identifying each user profile. In some cases, a host application may maintain the identifier of the user of the end device in its backend systems, which may correlate to the identifier of the third parties. In some exemplary embodiments, although the host application may not provide the agent with access to its source code, API, or the like, in some cases the host application or any other application of the end device may pass the identifier of the user to the agent, which may be used to fetch the user's profile from the third party system into the agent. In some exemplary embodiments, one or more applications at the end device may be associated with servers that utilize the identifier for personalizing content, or for any other purpose. For example, using the identifier of the user retained at the backend of an application, the agent may identify in the database of the client a user profile with a same identifier and extract that profile. In some exemplary embodiments, the accumulated profile data regarding the user may be retained at the end device of the user.

In some exemplary embodiments, based on the offline user information, the online user information, the profile information, or the like, the end device may generate a user profile, e.g., by the agent. In some exemplary embodiments, the user profile may indicate that a user of the end device matches a set of one or more micro-segments, e.g., based on matching a pattern of one or more micro-moments, locations, or the like.

In some exemplary embodiments, a profile of a user may be associated to a set of micro-segments, third party properties, non-PII segment categories that are not based on PII information, or the like. In some exemplary embodiments, at least one micro-segment indicated by the user profile may comprise at least one PII-based population category that describes the user. In some exemplary embodiments, the micro-segment may correspond to a category of a campaign provider that is based on PII information. In some exemplary embodiments, a micro-moment may define an event or timing of serving the content item to the user, which may be based on PII information. In some exemplary embodiments, a micro-segment may define an audience based on an activity, behavior, pattern of behavior, demographic attribute, or the like.

In some exemplary embodiments, the agent may categorize a user to micro-segments of the campaign provider or to any other third party segments defined by third parties, which may be obtained via the agent's API, e.g., as part of the third party user profile. In some exemplary embodiments, categorizing the accumulated user data may comprise identifying activities of the user based on patterns of sensor information, identifying frequencies and timeframes of activities, correlating between third party information such as web-based maps to the user information, or the like.

As an example, a micro-segment of the campaign provider may define a population that is categorized as having "flied at least once abroad, in the last month", which may be identified based on physical activity of the user, tracked online or offline behavior of the user, or the like. As yet another example, a micro-segment of the campaign provider may define a population that is categorized as "walking at least 30 minutes in a week for the last month", or "riding a bus at least twice a month", based on tracked physical activities of users, e.g., tracked at each end device. In some cases, micro-segments of the campaign provider may be defined based on online interaction, such as "accessing news applications or websites at least twice a day", "surfing the network at least one hour a day during the evening time", or the like. Additional examples of micro-segments may be based on a number of working hours of the user, a number of flights each timeframe such as a year the user takes, or the like. In some cases, micro-segments of third parties may be based on online activities or online transactions, such as "ordered a meal in McDonalds in the past week".

In some exemplary embodiments, the raw sensor information accumulated by the agent, or any other PII information enabling the determination that the user belongs to a micro-segment, a micro-moment, a third party segment, or the like, may not be divulged to external devices, hence preventing a server, even one controlled by an entity implementing the disclosed subject matter, from tracking PII information of the users. In some cases, privacy related regulations, such as the General Data Protection Regulation (GDPR), may not apply to databases that do not comprise PII information or may require a reduced standard for such databases.

In some exemplary embodiments, based on the at least one micro-segment that describes or matches the user, the end device may select one or more campaigns from a set of campaigns retained at the server of the campaign provider, the marketing system, or the like. Alternatively, a repository of campaigns may be obtained from the server, and the end device may select a personalized campaign from the repository retained at the end device. In some exemplary embodiments, the campaigns may be selected by end devices without the end devices providing any information regarding the user activities of their users.

In some exemplary embodiments, each campaign may comprise an action node of one or more rules for displaying at least one content item, e.g., embedded within the agents of the end devices. In some exemplary embodiments, the one or more rules for displaying the at least one content item may comprise at least one micro-moment, defining an offline event or a timeframe during which the at least one content item is configured to be displayed. In some exemplary embodiments, each end device may execute a distributed campaign in addition to accumulating real time PII information of the user. In some exemplary embodiments, after obtaining one or more campaigns, the end device may monitor the offline sensors of the end device to identify real time user activities of the user, such as offline activities, online activities, or the like. In some exemplary embodiments, the real time data may be used to modify the user profile, to identify micro-moments configured to trigger content serving, or the like.

In some exemplary embodiments, one or more contexts or micro-moments to which the user is associated may be identified based on tracked information of each user.

In some exemplary embodiments, one or more locations to which the user is associated may be identified based on tracked information of each user. In some exemplary embodiments, upon identifying, at the end device, that a rule of the campaign for displaying a content item is complied with, e.g., of an action node, the content item serving may be invoked. In some exemplary embodiments, the agent may display the content item, e.g., via a host application in which it is embedded, via SMS messages, or the like. In some exemplary embodiments, the host application may enable external pieces of software to be executed therein, enabling the SDK of the agent to be executed therein. In some exemplary embodiments, the agent may instruct the host application to display the content item, generate a display of the content item above the host application by itself, generate a display of the content item outside the host application such as via an SMS or e-mail, or the like. In some exemplary embodiments, the agent may obtain the content item from the campaign residing on the end device, or from the server, e.g., in case the content item is not located in local memory of the end device.

In some exemplary embodiments, the identified event of complying with a rule may comprise complying with one or more micro-moments during which content items are configured to be presented to the user. In some exemplary embodiments, a rule may be identified to be complied with based on the real time online and/or offline user activities that were monitored. In some exemplary embodiments, content serving may be triggered based on the rules, regardless of whether or not the user is currently interacting with the end device. In some exemplary embodiments, in case a micro-moment corresponds to one or more activities of the user identified when the user is not interacting with the end device, content serving may be triggered when the user is not interacting with the end device. For example, content serving may be triggered upon compliance with a rule "the user has returned from work and 15 minutes have passed", invoking content serving even in case the user is not interacting with her end device 15 minutes after returning from work. In some exemplary embodiments, a delivery method of delivering one or more attributes of the content item may be modified based on the real time online and/or offline user activities. For example, a content of a content item may be modified, a design of a content item may be modified, a frequency of presenting the content item may be modified, or the like.

In some exemplary embodiments, one or more interactions of the user with served content items of the campaign may be monitored, e.g., at the end device. In some exemplary embodiments, an interaction with the campaign may comprise pressing on a notification of a content item, converting or purchasing an advertised item, or the like. In some exemplary embodiments, while users respond to the content items, a count of interactions of each interaction type between the user and the served content items may be computed, accumulated, or the like, e.g., at a counter of the agent. In some exemplary embodiments, the count of interactions may comprise statistical parameters such as determining a Click-Through Rate (CTR) of a content item, or any other statistical parameter. In some exemplary embodiments, the count of interactions of each interaction type may be provided to the server, shared therewith, or the like, as it may not consist of PII information. In some exemplary embodiments, the count of interactions of each interaction type may enable the campaign provider to compute segment statistics, determine success rates of certain segments in certain types of campaigns, or the like.

In some exemplary embodiments, in order to identify the interactions of the user with the content items, the host application in which the content item is presented may notify the agent regarding clicks, conversions, or the like, that occurred within the application. In some exemplary embodiments, in case the host application does not provide the interaction information to the agent, due to one or more configurations, constraints, or the like, the agent may identify the interaction information by itself. In some exemplary embodiments, since the agent may not have access to the backend of the application, but may have access to internal data and processes of the end device, the agent may monitor the foreground and background of the end device. In some exemplary embodiments, the foreground of the end device may contain applications that the user is currently working on, interacting therewith, or the like, while the background of the end device may contain applications that are behind the scenes, that the user is not interacting therewith, or the like, such as certain operating system functions. In some exemplary embodiments, the agent may monitor the foreground and background of the end device and identify whether a notification presenting the content item is presented in the foreground or background of the end device. In case the notification is identified as being located in the background of the end device, this may indicate that the notification has not been selected by the user yet. In case the notification is located in the foreground, or is identified as moving from the background to the foreground, this may indicate that the notification was or is currently pressed by the user. In some exemplary embodiments, the notification may consist of a unique notification that is not a push notification or an in-app notification, as it may not depend on communications of the end device with external servers or entities. Instead, in case the content item is retained in the end device, the notification of the content item may consist of an offline notification that is invoked to be presented within a host application or elsewhere based on a local decision of the agent. In some exemplary embodiments, the notification may be presented even in case the user is not engaging or looking at the end device. In some cases, providing the notification may cause the user to look at the end device. For example, when the user is not looking at the device, he may be alerted vocally that the host application received a new notification, and be encouraged to view the notification that is provided by the agent.

In some exemplary embodiments, each end device may report to the campaign provider, implemented by a remote server, a cloud, a private cloud, a cluster of servers, or the like, success rates of micro-moments of the user, campaigns that match the micro-segments of the user, direct or indirect indications of one or more micro-segments to which the user belongs, or the like. Accordingly, the server retaining the set of campaigns may merely have access to the campaigns selected by each end device, the metadata of the campaigns, success rates of interactions types upon identifying micro-moments, and one or more micro-segments, without having access to any sensor data, activity data, location data, raw data, or the like of any user of a specific end device.

One technical effect of the disclosed subject matter is enabling end devices to perform a role of independent content servers, by enabling each end device to select a campaign with content items, to select content items of the campaign, to determine timing parameters for displaying the content items, to determine a quantity of displaying the content items, or the like. This distributes the role of the content server to the end devices. In some exemplary embodiments, by allowing the end devices to select relevant campaigns, the users of the end devices are kept completely anonymous and unidentified, without providing any PII data to the campaign provider.

Another technical effect of the disclosed subject matter is enabling a campaign provider to run a campaign based on unique offline activities of the user, which provide a more thorough and deep understanding of the user's activities in the real world, e.g., by distributing the content serving functionality to the end users and monitoring the sensors of the end devices. In some exemplary embodiments, the offline information may enrich the user's profile and enable the end device to select more accurate and personalized campaigns, enhancing a success rate of the campaigns. Although the campaign provider is provided with supplement capabilities, in the form of additional segment categories, selection of enhanced timings, contexts for presenting content items, or the like, he has no access to the monitored data itself, thereby securing a privacy of the user and complying with privacy regulations.

In some exemplary embodiments, the currently disclosed subject matter enables the user to select a wide and thorough variation of criteria for segmenting the end users, which may be derived from monitoring offline activity of the users, in addition to or instead of online activity. In some exemplary embodiments, the users' offline activities may comprise physical activities, home and office locations, places visited, or the like, which may be derived from offline sensors of the users, patterns thereof, or the like. In some exemplary embodiments, although the offline information may consist of PII information, the system may not violate any privacy regulation since the offline information may not be available to any external entity outside the end device.

Yet another technical effect of the disclosed subject matter is enabling a campaign provider to run a campaign based on user data derived from third party marketing systems, servers, websites, or the like. In some exemplary embodiments, the end devices may be enabled to obtain profile data of their user including information about the user's online or financial activities, which may be stored in third party marketing systems. In some exemplary embodiments, the third party information may contain segmentations and profiling that belong to the user. In some exemplary embodiments, the profile data may be fetched by the end device and utilized thereby without providing any information or PII data to back to the third party marketing systems. For example, marketing or CRM systems may collect and store profile information of one or more users, and an end device may request the information so that it can pull the information into the end device without sending any PII data back to the cloud. In some exemplary embodiments, upon fetching the user's third party profile, the information may be merged with the agent's information and used to create or enrich a user profile of the user. In some exemplary embodiments, enriching the user profile may enable the agents to select suitable campaigns, content items, or the like, thereby creating a richer and more personalized campaign for the user. In some exemplary embodiments, since the user is the owner of his own profile data, retrieving it to his end device does not violate the user's privacy.

Yet another technical effect of the disclosed subject matter is enabling a server to benefit from useful information, for purposes such as evaluating the effectiveness of the campaign or its content, while maintaining the privacy of the users. In some exemplary embodiments, the end devices may provide the server with statistical information regarding the interactions of the user with a campaign, with information regarding campaign selections in response to compliance with micro-moments, or the like, which may not enable to identify the user.

In some exemplary embodiments, the disclosed subject matter may preserve privacy of the end-user. In some exemplary embodiments, each campaign is assigned a unique identifier at the campaign provider, so that information sent by the agent can be utilized by the server to calculate statistics regarding the campaign, e.g., interactions of users with the campaign's content items, without any PII data. For example, a rule that "when a person enters home, wait 15 minutes and show a content item" may be executed on the user device without anyone knowing when users enter their home, or where the user's home is located, but a success rate of the rule and a reaction of the user may be provided to the server and analyzed to provide insights.

Yet another technical effect of the disclosed subject matter is mitigating the limitations of streaming APIs of end devices, that typically update individual user properties consisting of PII information into the marketing systems, thereby violating the user privacy. The disclosed subject matter mitigates this drawback by aggregating campaign data from multiple end devices and then ingesting the data using bulk APIs.

The disclosed subject matter may provide for one or more technical improvements over any pre-existing technique and any technique that has previously become routine or conventional in the art. Additional technical problems, technical solutions and technical effects may be apparent to a person of ordinary skill in the art in view of the present disclosure.

Referring now to FIG. 1, showing a schematic illustration of an environment in which some exemplary embodiments of the disclosed subject matter can be used.

Environment 100 may comprise a Server 120, which may be connected to Computerized Network 105. In some exemplary embodiments, Server 120 may comprise a content server of a campaign provider such as an MA system, a marketing system, or the like, that is configured to enable a client to generate and create one or more campaigns that are configured to be provided to a plurality of End Devices 110.

In some exemplary embodiments, Environment 100 may comprise a plurality of End Devices 110. End Devices 110 may comprise Personal Computers (PCs), tablets, smartphones, or the like. End Devices 110 may be connected to a Computerized Network 105, such as a WAN, a LAN, a wireless network, the Internet, an intranet, or the like. In some exemplary embodiments, each End Device 110 may be configured to execute one or more applications such as a web page, a web application, a mobile application, a desktop application, or the like.

In some exemplary embodiments, an Agent 115 may be running on End Device 110. In some exemplary embodiments, each End Device 110 may execute a corresponding Agent 115. Additionally or alternatively, only a portion of End Devices 110 may execute an Agent 115. Agent 115 may be a program product executable by a computer, such as, without limitations, a script, a software, a browser extension, a mobile application, a web application, an SDK, a shared library, a Dynamic Link Library (DLL), a combination thereof, or the like. In some exemplary embodiments, an SDK of Agent 115 may be embedded or executed on the host application, enabling the Agent 115 to display one or more notifications via the application, instruct the application to display one or more notifications, or the like. Alternatively, Agent 115 may consist of an independent application.

In some exemplary embodiments, Server 120 or an entity associated therewith may be configured to generate, update, or create the Agents 115, and distribute the Agents 115 to End Devices 110. In some exemplary embodiments, each Agent 115 of an End Device 110 may be configured to track one or more online user activities of the user, one or more offline user activities of the user, or the like, e.g., using sensors and receivers of the respective End Device 110. In some exemplary embodiments, the Agent 115 may be configured to obtain profile data from one or more external sources, e.g., third party marketing systems which may or may not be associated with one or more applications installed on an End Device 110.

In some exemplary embodiments, based on the accumulated user data, the Agent 115 may generate a user profile of the user, indicating one or more segments or categories of the user, e.g., micro-segments of audience, activities, contexts, demographic information, locations, or the like. In some exemplary embodiments, Agents 115 may be configured to communicate with Server 120, and obtain from Server 120 one or more campaigns that match the user profile, e.g., a campaign that targets users that have attributes that match the user profile. In some exemplary embodiments, the campaigns may comprise content items of a campaign and/or one or more rules for displaying the content items to the user.

In some exemplary embodiments, the Agent 115 may monitor the user interactions with displayed content items, and provide statistical information regarding the interactions to Server 120. In some exemplary embodiments, the statistical information may consist of non-PII information, that does not enable to identify the user, thereby securing the privacy of the user. In some exemplary embodiments, Server 120 may analyze interaction reports of campaigns from Agents 115 of End Devices 110, and determine one or more statistical parameters of each campaign, e.g., to determine its success rates, or any other metric.

Figure 2:
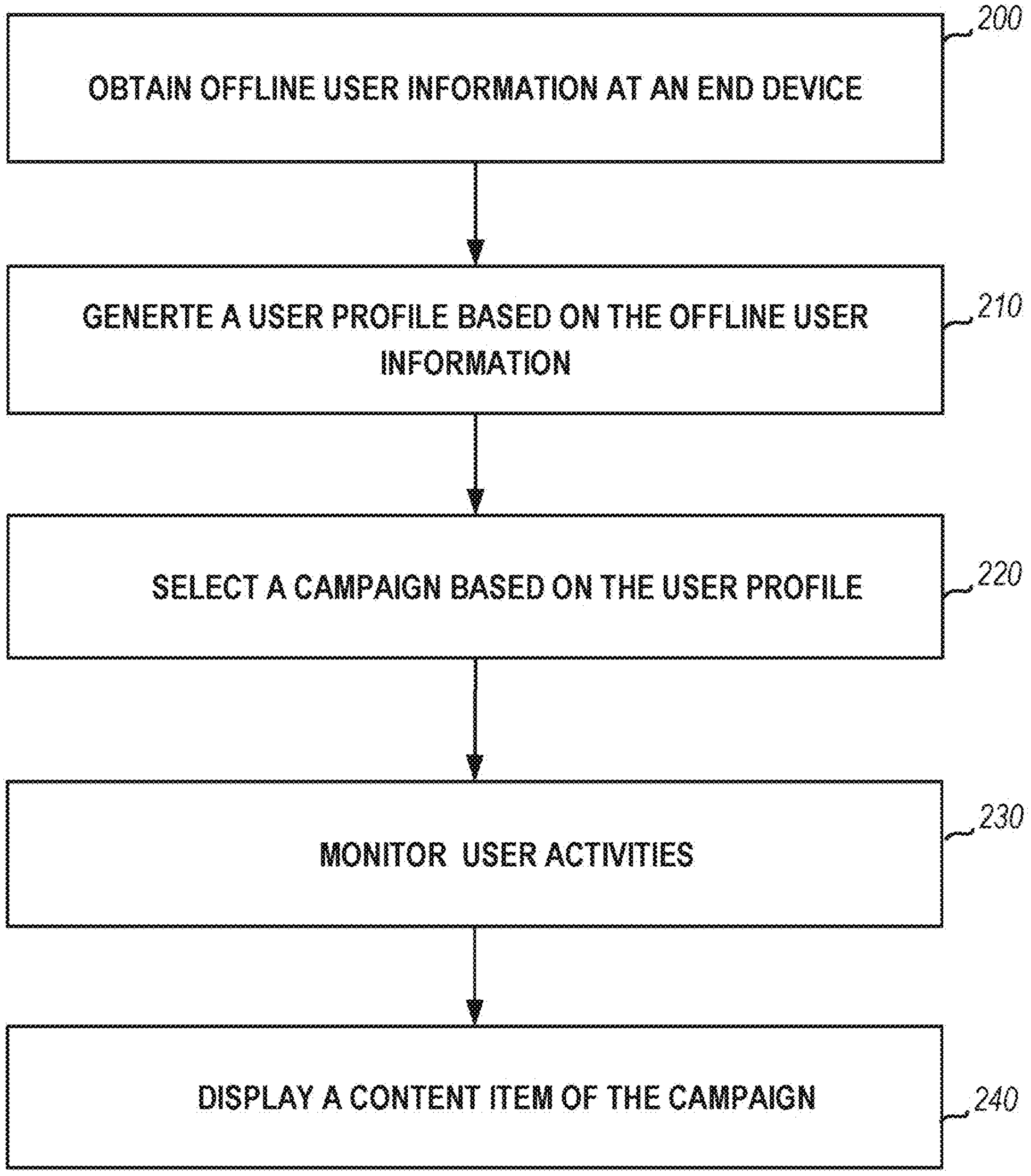
FIG. 2 illustrates a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 200, offline user information may be obtained at an agent of an end device. In some exemplary embodiments, the end device may be provided with a software agent consisting of an SDK with an API. The agent may be configured to identify offline real world activities of the user by monitoring offline sensors, interactions, and/or communications of the end device, e.g., in real time. In some exemplary embodiments, the offline user information may be obtained from offline sensors of the end device. In some exemplary embodiments, the agent may track offline user activities such as driving, leaving work, or the like, by merely monitoring the sensor information of the end device.

Additionally or alternatively, the agent may track online user activities such as identifying that the user performed an action of "opening his email", which may be identified by monitoring the end device's communication transceivers, ports, browser information, or the like. In some exemplary embodiments, the agent may monitor sensors of the end device, monitor online communications of its end device, utilize geofencing capabilities of its end device, utilize information associated with a location, date and time of its end device, or any other conditions and information that can be gathered by the agent. In some exemplary embodiments, the agent may track real world activities of users in real time, as well as online activities, and retain the tracked information in a repository or library.

In some exemplary embodiments, the agent may create a repository of tracked activities of the user, which may consist of micro-segments of the user, e.g., based on offline and online user activities.

In some exemplary embodiments, the agent may obtain third party profile information of the user, and combine it with the agent's accumulated offline and/or online data regarding the user in order to enrich the information about the user. In some exemplary embodiments, the agent may combine the third party profile information with its own repository of tracked information. In some exemplary embodiments, the third party profile information may comprise information stored or owned by third parties such as third party marketing systems which may or may not be associated with the host application hosting the agent, with an application of the end device that does not host the agent, with the campaign provider, or the like. For example, the third party information may indicate buying habits of the user, interests of the user, or any other non-PII category or segmentation describing the user. In some exemplary embodiments, the third party systems may obtain information of users by tracking the users' activities on the world wide web, tracking the users' activities via their credit card transactions, tracking the users' activities via their interactions with various mobile applications or websites of the third party systems, or in any other manner. For example, FACEBOOK™ may monitor activities of the user via its website and mobile application, and generate a profile of the user based thereon. In some exemplary embodiments, third party servers such as belonging to marketers may retain their own repository of online user information, each record of a user retained with a unique identifier. For example, CRM systems or Marketing Automation (MA) systems may collect and store profile information of one or more users.

In some exemplary embodiments, the agent may request the third party information from one or more third party systems in order to draw the information into the end device without sending any PII data back to the third party system's cloud, server, or the like. In some exemplary embodiments, in many cases it may be challenging to match a third party profile of the user to the user of the end device, e.g., since different tracking systems may utilize different identifiers to identify users. For example, a marketing system such as belonging to FACEBOOK™ may collect information regarding a user and generate a user identifier to uniquely identify the user. However, the agent of the end device may not be able to correlate between the customer identifier that is retained in FACEBOOK™ for internal identification of users, and the user of the end device, to determine that they refer to the same person. In some cases, the host application or any other application in the end device may retain the unique identifier of the user, or have access to the unique identifier of the user via a server. This may allow the application to identify the user in its backend systems or in any other third party system that shares the same user identifier in association with the user's profile. In some exemplary embodiments, the host application may pass this identifier to the agent, which may use the identifier to match the third party profile to the user of the end device. In some exemplary embodiments, the user's profile may be fetched from the backend of the third party and into the agent's SDK, e.g., using the user identifier. In some exemplary embodiments, the third party profile information may be accumulated or ingested by the agent. In some exemplary embodiments, upon fetching the user's third party profile, the third party information may be combined with the agent's accumulated user information, thereby enabling to achieve a richer and more accurate understanding of the user.

In some exemplary embodiments, the profiling data that is extracted from the third party system may not contain PII data, but rather may contain segmentations or profiling categories that belong to a specific user. In some exemplary embodiments, since the profiling information may not comprise PII data, in case an end device extracts the profile information of a wrong person that is not the device's owner, e.g., by mistake or malice, there will be no way to trace the wrong person based on the extracted profile's data, and violate her privacy. For example, the extracted profile data may indicate segmentations of the associated person indicating that the person buys golf equipment, buys vegan food and goes to various cinemas, all of these consisting of attributes or information items that cannot be used to uniquely identify the person associated with the profile. According to this example, in case a wrong profile was retrieved, there may be no way to identify the person that is associated to the profile. In some exemplary embodiments, accumulating the data by the agent may not violate the user's privacy, as long as the data is not shared with unauthorized parties.

On Step 210, a user profile of a user of the end device may be generated at the end device, e.g., based on the offline user information, the online user information, the third party information, patterns thereof, or the like. In some exemplary embodiments, the agent may process the accumulated information and identify one or more activities, action patterns, or the like, associated with the user. In some exemplary embodiments, based on the user activities and their recurring patterns, an advertising profile of the activities of the user may be created, e.g., locally at the end device.

In some exemplary embodiments, the user profile may indicate that the user matches at least one micro-segment of an audience. In some exemplary embodiments, the at least one micro-segment may comprise at least one respective population category, at least one detailed population category that defines the user, an activity category, or the like, which may or may not be based on PII information. For example, the user profile may indicate that the user roller skates at least twice a week while listening to sad music, which may be determined based on patterns of online and offline information gathered by monitoring sensors of the end device.

In some exemplary embodiments, in case third party information is obtained, the user profile may include a segment from third party profiling information, which may be based on online data of the user, e.g., his buying habits. The third party information may enrich the capabilities of the edge device, e.g., its edge offering capabilities, by enhancing the accuracy and details of the user profile without providing any PII data of the user to any entity external to the edge device.

On Step 220, based on the user profile, a campaign (also referred to as a "journey") may be selected from a set of one or more campaigns retained at a server, a cloud, a campaign provider, or the like. In some exemplary embodiments, the agent may select the campaign based on correlating one or more attributes of the user profile to one or more attributes of the set of campaigns. In some exemplary embodiments, the campaign may be selected to match the profile of the user. For example, the agent may select a campaign that is targeted to one or more micro-segments that are indicated by the user profile. As another example, the agent may select a campaign that is determined to be relevant to the user based on one or more interests of the user that are indicated in the user profile. As another example, the agent may select a campaign that is targeted to micro-moments that are frequently identified by the end device. In some exemplary embodiments, the agent may fetch general campaigns, campaigns that match the user's profile retained by the agent, campaigns that match the user's segment, campaigns that match user restrictions such as privacy restrictions, or the like.

In some exemplary embodiments, once a campaign is activated on the server, it may be deployed to end users' devices. In some exemplary embodiments, although the campaign is built at a server, it may be handled independently at the end devices, which may decide whether or not the campaign should be executed, which campaigns are relevant, or the like, based on the profile of the user. The agent may periodically connect to the server and fetch campaigns that match the specific user's profile and restrictions, e.g., privacy restrictions. In some exemplary embodiments, upon selecting one or more campaigns, the campaigns may be fetched to the end device fully or partially. The agent may either download the entire campaign, or just its structure or rules without downloading the campaign's media or content items themselves until they become relevant for being displayed (referred to as "lazy fetching"). In some exemplary embodiments, the agent may perform a lazy fetching in order to conserve space and network consumption. In some exemplary embodiments, the server may generate an executable code, such as JavaScript™M, that implements the rules of the activity nodes defined by the campaign. Additional resources of the campaign, such as images, binaries, manifest files, certificates, or the like, may or may not be downloaded to be available offline at the end device.

In some exemplary embodiments, each campaign may comprise one or more content items and one or more rules for displaying the content items. In some exemplary embodiments, the one or more rules of the campaign may include conditions or contexts for presenting the content items such as micro-moments, conditions for modifying the content items in one or more delivery manners, conditions for determining a frequency of presenting each content item, or the like. In some exemplary embodiments, in some cases, a campaign may enable the agent to determine one or more of the rules itself, e.g., based on a predictor, a classifier, or the like.

In some exemplary embodiments, the accuracy of the user profile may correlate linearly to the level of personalization of the campaign, the quality of the campaign, or the like. In other words, an accurate user profile may cause the agent to select campaigns that are a better match to the user, while an inaccurate user profile may cause the agent to select campaigns that are a worse match to the user, resulting with a worse user experience, a reduced interaction level, or the like.

In some cases, the agent may transmit to the server indications of micro-moments that were invoked for each content item. In some exemplary embodiments, although the micro-moments may comprise non-identifying general information without any specific location or time information, a large number of certain micro-moments may enable to extract more information that can potentially comprise PII information. In some exemplary embodiments, in order to eliminate this option, the agent may not report a set of micro-segments that together could be used to identify the user or a small group of people comprising the user.

In some exemplary embodiments, the end devices may not share user segments of their user with the campaign provider. Instead, the campaign serving functionality may be distributed, and each agent on each end device may independently select a campaign from the campaign provider based on a user profile retained by the respective agent. In some exemplary embodiments, although the campaign is created at a remote server or cloud, it may be handled independently at the end devices, which may decide whether or not the campaign should be executed at the end device, which campaigns are relevant for the end device, which content items should be served, or the like, e.g., based on the locally-retained profile of the user. It this case, the server may not retain any micro-segments of the user. Additionally or alternatively, the server may transmit to the agent a set of micro-segments related to each campaign, e.g., metadata, and the agent may indicate which of the campaigns are relevant to the user. This way, the agent does not divulge the information regarding the micro-segments of the user, and instead, merely indicates whether or not the micro-segments defined for a campaign are relevant for the user.

In some exemplary embodiments, the agent may periodically connect to the server or campaign manager that retains a repository of campaigns in order to select one or more campaigns that match the user's profile and fetch the campaigns to the end device.

On Step 230, the end device may be monitored to identify real time user activities of the user. In some exemplary embodiments, monitoring the end device may include monitoring the offline sensors, the online component, the communications of the end device, or the like. In some exemplary embodiments, upon selecting and obtaining a campaign from the server, the agent may store the campaign rules of the activity nodes determined by the client, such as timing or location rules. In some exemplary embodiments, the agent may process the rules and monitor the user's real time user activities and actions to determine whether one or more rules or conditions of the campaign are complied with, e.g., whether the user entered a certain area, whether a specific micro-moment or pattern of micro-moments was encountered, or the like. For example, the agent may monitor the user activities to identify a compliance with one or more micro moments defining whether the user entered a certain area, whether the user is performing a certain activity, whether the user finished to perform an activity, a timeout from an activity, or the like.

In some exemplary embodiments, the real time user activities of the user may be monitored in order to identify an event that indicates that content items are to be displayed to the user. In some exemplary embodiments, the event may be defined by the rules of activity nodes of the campaign. In some exemplary embodiments, the agent may be utilized to serve a content item in case an opportunity occurs, such as during an impression opportunity defined by an activity node. The agent may select a content item to be displayed during the impression opportunity based on campaign definitions, micro-moments that occurred within a recent timeframe, micro-segments of which the user is a member, or the like. In some exemplary embodiments, the content items may be displayed in response to a trigger issued by the agent, e.g., via an SMS. In some exemplary embodiments, the content items may be displayed internally within an application, such as using a splash screen, a banner, a pop-up, or the like.

On step 240, a content item of the campaign may be displayed, upon identifying that a rule of the one or more rules for displaying the content item is complied with. In some exemplary embodiments, identifying the compliance with the rule may be based on the real time user activities monitored on Step 230, and may be performed at the end device. In some exemplary embodiments, the content serving may be triggered upon identifying an offline event associated with offline rules, an online event associated with online rules, or the like, e.g., designed as part of a real-world journey of the user.

In some exemplary embodiments, upon identifying that one or more campaign rules are met, the agent may reach an action node of the campaign. In some exemplary embodiments, a content item may be displayed to the user. In some exemplary embodiments, in case of lazy fetching, the agent may communicate with the server to obtain from the server one or more desired content items of the campaign, additional resources, or the like. In some exemplary embodiments, the agent may serve the content items to the user, e.g., by instructing the host application in which the agent is embedded to display the content item, displaying the content items via a social network medium, displaying the content items via an application retained at the end device, displaying the content items via a non-application medium such as an SMS message, or the like.

In some exemplary embodiments, the notification may originate internally from the end device, without assistance of push notification servers, or other content servers. In some cases, the notification may be implemented even in case the end device is not connected to the Internet or to another computer network. In some exemplary embodiments, the content items may be served as triggers or notifications, that are a result of offline mobility data, of online interactions with websites or mobile applications, a combination thereof, or the like. In some exemplary embodiments, internal non-push notifications may introduce a whole new family of triggers into the campaign management world, that are the result of mobility and not necessarily of interactions with a website application or a mobile application.

In some exemplary embodiments, once a user of an end device reaches the defined point in the campaign or journey, the end device may fetch content item from the client's MA system, without sending real time information of the user back to the MA system's cloud. For example, a micro-moment rule of the campaign may define that in case the user enters his home, and has been running during the morning hours, a content item is to be served to the user after 3 minutes, causing the agent to wait 3 minutes and then trigger a content serving without notifying the server when the user entered his home or whether the use has been running.

In some exemplary embodiments, in case the desired content item is retained at the end device, e.g., in case of full fetching or after performing lazy fetching, the agent may serve the content item immediately, e.g., by providing the content item to the host application, issuing the notifications via an application retained at the end device, or the like, without communicating with the server. In some exemplary embodiments, both tracking the user's activities and serving the content item may consist of offline actions that are performed offline, without involving a server of the campaign provider, without communicating with a server, without divulging private information, or the like.

In some exemplary embodiments, in addition to or instead of utilizing server-dictating rules for a campaign, a personalized classifier or module may be trained on the agent's accumulated user data, sensor data, or the like. The personalized module may be configured to determine an optimal timing, type and quantity of content items for the specific user. In some exemplary embodiments, a personal model may be trained locally based on a user history of each end user that is retained by the end device, to predict target micro-moments for displaying content items to the user, target manners of presenting the content items, or the like. In some exemplary embodiments, the personalized module may determine an optimal timing for serving content items, a selection of content items from the available content items of the retained campaigns, a quantity of each content item that is to be served for the user, or the like. For example, a user that tends to click on content items such as advertisements every evening at 8 PM may be targeted at that time, although most people may be more likely on average to click on content items at morning hours. In some exemplary embodiments, upon receiving campaigns from the server, the agent may determine an optimal policy for the specific user based on the personalized module. In some exemplary embodiments, the personalized module may be utilized in case the campaign instructs or enables the agent to utilize the module, e.g., always, in one or more scenarios, regarding one or more decisions, or the like.

In some exemplary embodiments, the personalized module may be trained on monitored activities of the user, in addition to a history of success and failure rates of campaigns at the end device, a context of the historic interactions, or the like. The personalized module may implement machine learning techniques such as Support Vector Machines (SVM), decision trees, Artificial Neural Networks (ANN), Deep Neural Networks (DNN), clustering, or the like, to enable training and improving multi-feature-based prediction of responses of the end-user. The personalized module, which may inherently represent private information (e.g., a user's tendency to interact with specific types of content at specific times, such as gambling over weekends, medical advice during office hours), may remain on the user's end-device and not be reported to the server. In such an embodiment, the personalized module may be utilized to optimize content serving to the user without jeopardizing the user's privacy. Additionally, or alternatively, such as in cases where the user gave consent, the personalized module may be transmitted to the server, generated at the server, or the like, and utilized therein.

In some exemplary embodiments, a general predictor may be trained at a server, a campaign provider, or the like, in order to identify micro-segments, locations, micro-moments, or the like, that increase a probability that users will interact with a specific campaign, with campaigns in general, or the like. In some exemplary embodiments, the predictor may be trained based on a database of a plurality of user attributes and their interaction rates, which may comprise non-PII information such as segment information with associated success rates, information of users that consented of providing their personal information, or the like, which may be accumulated via a plurality of agents of respective end devices, obtained from a third party, or the like. In some exemplary embodiments, upon completing the training, during inference stage, the trained predictor may be distributed to the end devices. In some exemplary embodiments, based on the trained predictor, an end device may locally determine whether to provide a content item to the user, micro-moments during which the content item should be provided, a number of times that the content item should be served, or the like. In some exemplary embodiments, the predictor may provide or output a prediction of a user segment's click rate, a user segment's conversion rate, or the like, and in case the predicted rate is above a threshold, a content item may be determined to be served. For example, a campaign rule may determine that in case a predicted rate for a campaign is above 80%, campaign notifications may be served to the user. In some exemplary embodiments, the privacy of the user may be retained since the predictor may be retained and executed locally at each end device, based on the user's profile that is retained at the end device.

In some exemplary embodiments, the agent may track the user's response to a provided campaign content. In some exemplary embodiments, in order to determine whether the user was interested in a content item, the host application may provide the information directly to the agent. In one embodiment, the content may be displayed in a notification and clicking the notification may trigger a counter increment function. This may be the case where the agent is embedded into the host application that displayed the notification, during which the host application that displayed the notification, activates the increment function of an API of the agent, or the like. In some exemplary embodiments, the agent may determine whether the user was interested in a content item by identifying whether the application moved from the background of the device to the foreground after a notification was served. In some exemplary embodiments, such as when in response to the notification, an application that does not report the interaction to the agent is activated, the agent may track the application that is in the foreground of the device and deduce interaction of the user based thereon. As another example, the agent may monitor activity of the end-user to deduce that the served content triggered a response from the end-user. The agent may utilize the sensors of the end device to detect that the user looks at the device, engages with the device, or the like. As an example, if the user moved to the target application and remained with that application in the foreground for at least a minimal time threshold (e.g., 15 seconds when the device is active, 15 seconds when the end-user is looking at the device, 30 seconds in absolute time, or the like), then the agent may count this impression as causing an interaction by the end user.

In some exemplary embodiments, a server may perform analytics of the campaign in order to measure the performance of a campaign. In some exemplary embodiments, each campaign may have a unique campaign identifier, that is used by the agent when sending anonymized statistical information regarding the campaign's performance at a plurality of end devices to the server. In some exemplary embodiments, the agent may record any interaction of the user with the campaign's content items via the end device, and send the interaction information without PII data to the backend of the campaign manager.

In some exemplary embodiments, using the interaction information, the backend server may be enabled to determine how many users matched each segmentation rule of the campaign, based on how many calls were received asking to fetch a campaign that matched a specific list of micro-segments. The count of calls may be classified at the server according to micro-segments, to identify how many end users matched selected segmentation rules of the campaign. In some exemplary embodiments, this may provide information about the segment size, e.g., the size of the potential audience of a campaign. In some exemplary embodiments, a total count of content items that were served by the agent may be maintained at the server. In some exemplary embodiments, a total count of user interactions with the campaign of each interaction type can be retained, e.g., including interactions such as reacting to the campaign by buying an advertised item, adding an item to a wish list, saving an item for later, marking an item as irrelevant, or the like. In some exemplary embodiments, the backend server may be enabled to determine how many users performed each type of interaction with the content item. Additionally, or alternatively, the end devices may report back to the server one or more micro-moments that occurred while the interaction was performed. The server may statistically analyze the micro-moments and their results to determine a set of micro-moments in which users interact with the campaign. In some exemplary embodiments, the server may identify one or more statistical parameters such as a CTR parameter associated with micro-segments and micro-moments of the campaign.

In some exemplary embodiments, the backend server may be enabled to determine a campaign reach, indicating how many users were shown the content items defined in a campaign. In some exemplary embodiments, reach analysis may be performed at the server to ensure that the selected micro-segments and micro-moments reach a big enough audience so that no personal information can be inferred from the results. A privacy breach may enable clients to find a segment that only matches a small number of people, e.g., thereby almost identifying the people that match the segment. In some exemplary embodiments, in order to eliminate the privacy breach, the micro-segments may be defined to reach at least a certain number of people, e.g., 100 people, based on a reachability analysis.

In some exemplary embodiments, in case users are forwarded to a website, the agent may send the campaign identifier, alone or in addition to non-PII data of the user such as a type of the user's end device, his country, or the like, which may be recorded and used for analytics.

In some exemplary embodiments, in case users give consent to use their PII information, all the monitored or available data including PII data may be sent to the server of the MA system to enrich campaigns with the data, create a training dataset, or the like. In some exemplary embodiments, this removes the privacy issue on collecting the data, requiring the agent to merely ensure that the data is transferred in a secure manner.

Figure 3:
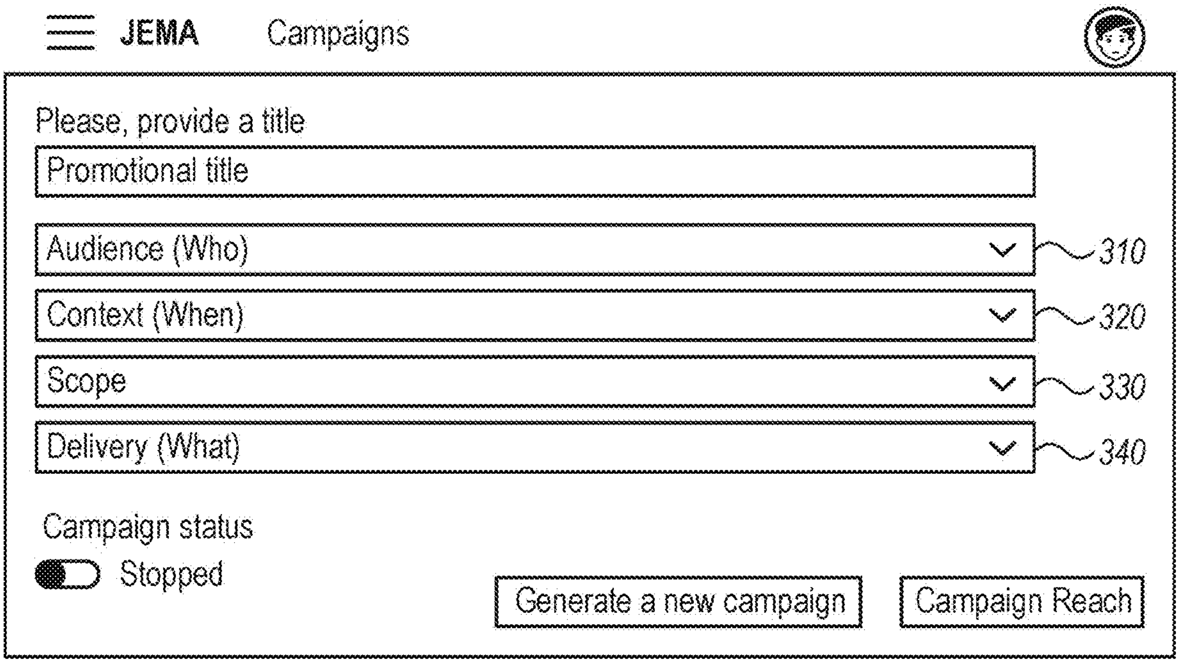
FIG. 3 shows an illustration of a User Interface (UI) for defining a campaign, in accordance with some exemplary embodiments of the disclosed subject matter.

Referring now to FIG. 3 showing an illustration of a User Interface (UI) for defining a desired campaign by an administrative user, a client, or the like, in accordance with some exemplary embodiments of the disclosed subject matter. In some exemplary embodiments, the administrative user may define a title for the future campaign and then proceed to define an Audience 310 ("who"), a Context 320 ("when") for presenting content items, a Scope 330 ("where") and a Delivery 340 ("what"). Each campaign may be assigned a unique campaign identifier, that may be identical over every end user executing the campaign.

In some exemplary embodiments, Audience 310 may enable to define one or more segments, micro-segments, user categories, proprietary micro-segments, or the like, of users that are to be targeted by the campaign. In some exemplary embodiments, Context 320 may enable to define one or more micro-moments, timing parameters, or the like, indicating when users should be served with content items of the campaign. In some exemplary embodiments, Scope 330 may enable to define one or more locations, countries, cities, towns, or the like, that end users located therein are to be targeted. In some exemplary embodiments, Delivery 340 may define one or more delivery methods or contents for delivering the content items of the campaign. In some exemplary embodiments, end users may be targeted in case they match the audience criteria, and content items may be presented based on the context and scope criteria. In some exemplary embodiments, an estimated reach of the campaign ("Campaign Reach") may be determined based on the selected Audience 310, Context 320, Scope 330, and Delivery 340, e.g., in order to assist the administrative user in defining the campaign.

Figure 4:
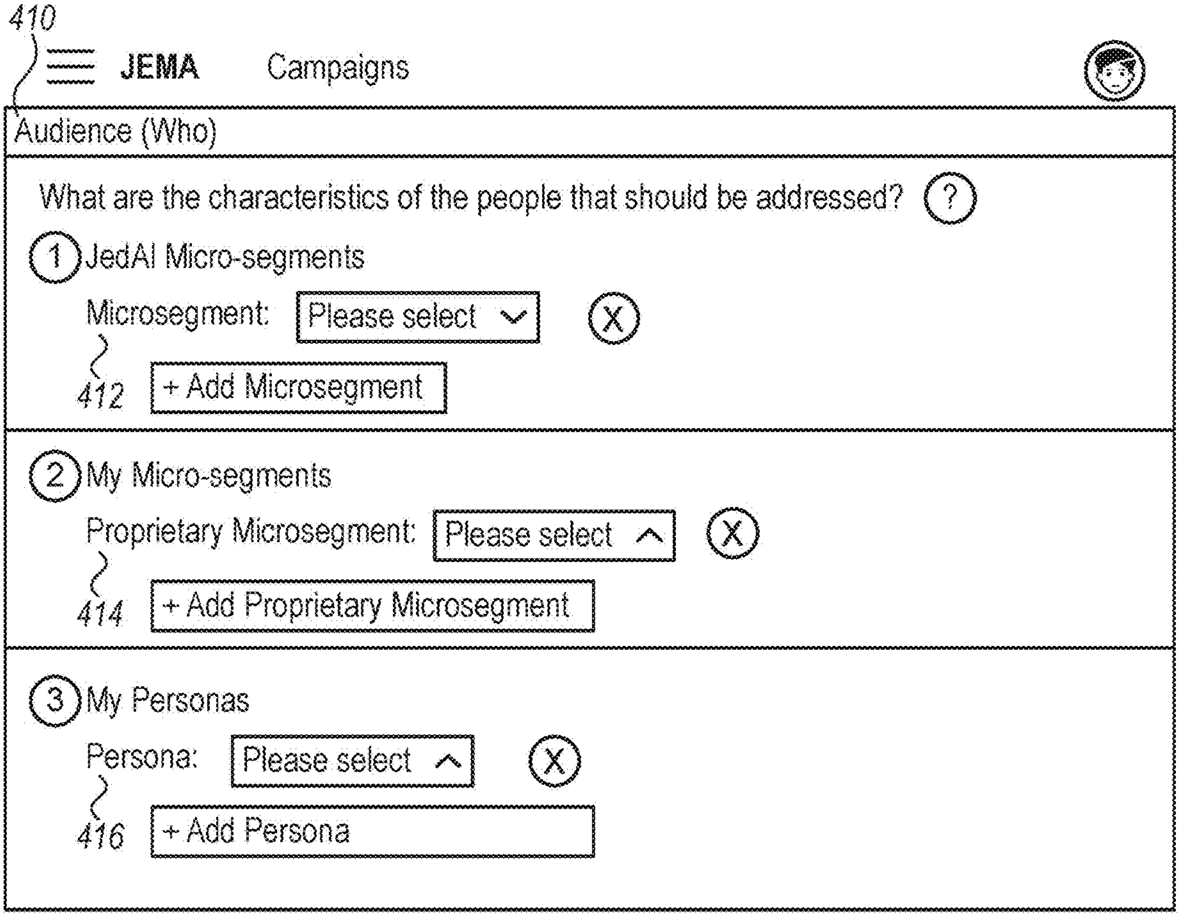
FIG. 4 shows an illustration of an exemplary UI for defining an audience, in accordance with some exemplary embodiments of the disclosed subject matter.

Referring now to FIG. 4 showing an illustration of an exemplary UI for defining the audience of the campaign, in accordance with some exemplary embodiments of the disclosed subject matter. In some exemplary embodiments, Audience 410 may correspond to Audience 310 (FIG. 3). In some exemplary embodiments, the administrative user may select the campaign's audience by selecting a set of Micro-Segments 412, e.g., including micro-segments that can be identified based on offline PII user information, online PII information, non-PII information, a combination thereof, or the like. In some exemplary embodiments, the administrative user may define set operations on Micro-Segments 412 to determine the audience on which the campaign may be activated.

As is exemplified in FIG. 4, Proprietary Micro-Segments 414 from a third party may be provided on top of the agent-defined micro-segments, e.g., third party information of the client. Proprietary Micro-Segments 414 may be utilized to further define additional micro-segments of end-users that are of interest, based on online user data accumulated by the third party. In some exemplary embodiments, different clients of the campaign provider may augment the data with their own proprietary information, such as using an API to indicate such information. In some exemplary embodiments, each proprietary information may be available only for a specific client that owns the additional information and not for other clients. As an example, the disclosed subject matter may obtain profile information about the user's online or financial activities that is stored in third party marketing systems. In some exemplary embodiments, while the agents of the end devices may each create a repository of tracked activities offline and online of the user, marketers may accumulate their own repository of online user information. The third party information may comprise segmentations that are based on non-PII accumulated information. For example, the third party information can includes buying habits and interests of the user, which are not PII. The third party information may be utilized to enrich the system's capabilities, e.g., by providing Proprietary Micro-Segments 414 to the campaign provider and providing user profile information to end devices. As a concrete example, AMAZON™ may augment the database with their own score for an end-user, and may define a campaign to target audience based on the score that was assigned to them.

Figure 15:
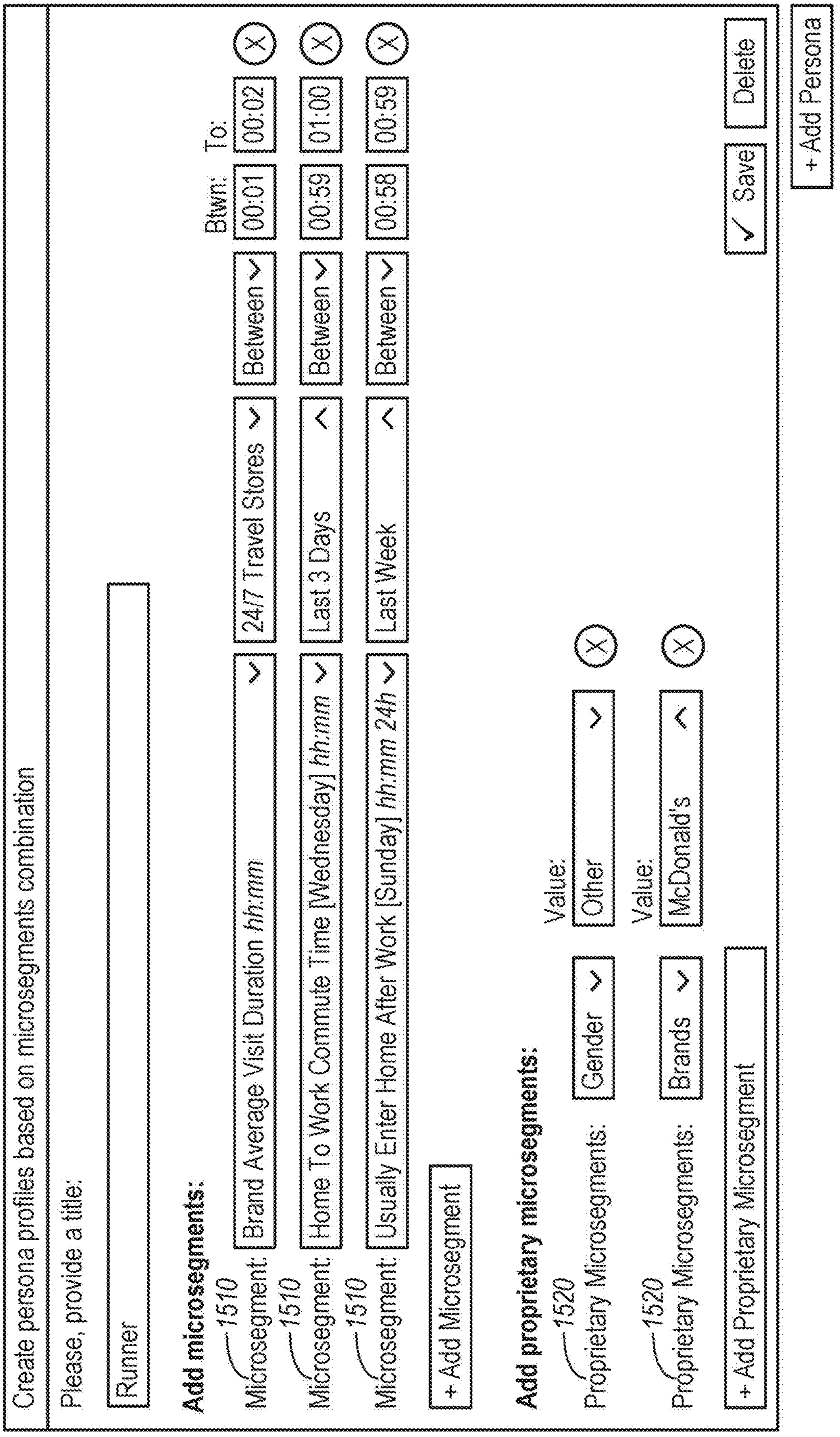
FIG. 15 shows an exemplified UI of a persona building platform, in accordance with some exemplary embodiments of the disclosed subject matter.

In some cases, some combinations of segments, e.g., Micro-Segments 412 and/or Micro-Segments 414, may be defined as Personas 416 that are targeted. For example, a Persona 416 of a "workaholic" type of person may be defined based on being at work at least 10 hours a day and not taking a vacation in the last year (i.e., as a conjunction of a micro-segment and a negation of another micro-segment). An exemplary UI for defining a persona is shown in FIG. 15.

Figure 5:
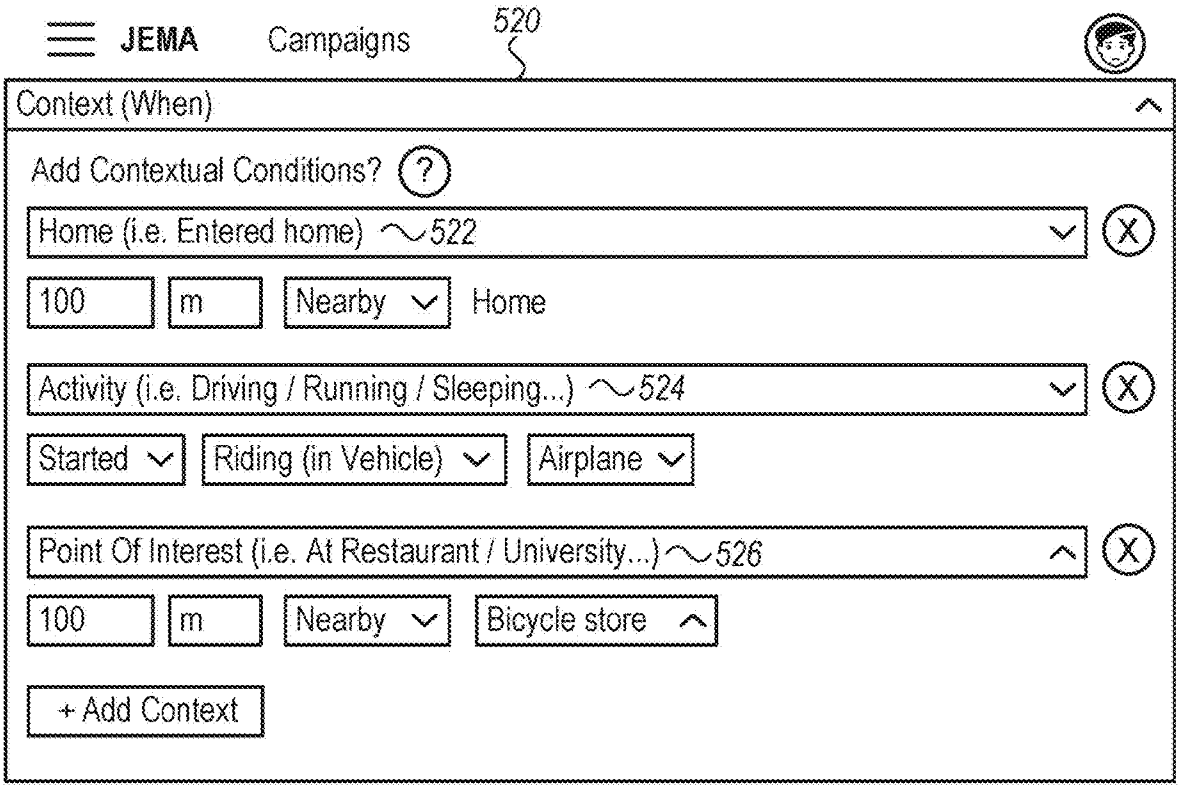
FIG. 5 shows an illustration of an exemplary UI for defining a context, in accordance with some exemplary embodiments of the disclosed subject matter.

Referring now to FIG. 5 showing an illustration of an exemplary UI for defining the context of the campaign, in accordance with some exemplary embodiments of the disclosed subject matter. In some exemplary embodiments, Context 520 may correspond to Context 320 (FIG. 3). In some exemplary embodiments, the administrative user may define one or more events or micro-moments that are configured to trigger content serving of the campaign, activate an action node of the campaign, or the like. The administrative user may define one micro-moment, a set of alternative micro-moments, a sequence of micro-moments with or without temporal relationships therebetween, or the like.

As is exemplified in FIG. 5, a UI may define different types of micro-moments for Context 520, such as Location Micro-Moments 522 that define an event of entering or exiting a determined location such as home of the user, his work place, or the like. Examples of Location Micro-Moments 522 may include whether the user is at "at a mall", whether the user is "at a dealership", whether the user is "at school", whether the user is "at work", whether the user is "at home", whether the user is "at hotel", whether the user is "at kindergarten", whether the user is "at gym", or the like.

In some exemplary embodiments, Context 520 may include Activity Micro-Moments 524 that define an event of riding a bicycle, flying on an airplane, or the like, a time-frame associated to the activity such as a start or end thereof, or the like. Examples of Micro-Moments 524 may include whether the end device is connected or disconnected to WIFI, whether the user is driving, whether the user is provided with an external trigger, whether the user is going to sleep, whether the user is starting or finishing a visit, whether the user is cycling or running, whether the end device is disconnected or connected to a charger, whether the user entered or exited a micro-fence area, whether the user is walking up, whether the user is idle, whether the user finished an activity, or the like.

In some exemplary embodiments, Context 520 may include General Location Micro-Moments 526 that define an event of approaching a relative location from a general POI such as any bicycle store. Examples of General Location Micro-Moments 526 may include whether the user is "near church", whether the user is "near shop", whether the user is "near school", whether the user is "near police", or the like.

It is noted that the micro-moment may be identified by the end device, by sensors, or the like, even when the user is not actively using the device. As an example, a micro-moment may define an activity: "after the user parked her car". Hence, the user may not even be holding her device, and still the micro-moment may be deemed as occurring. As another example, the micro-moments may be identified when the device has no connectivity, and still, the micro-moment may be identified using offline sensors, and the content of the campaign may be delivered.

Figure 6:
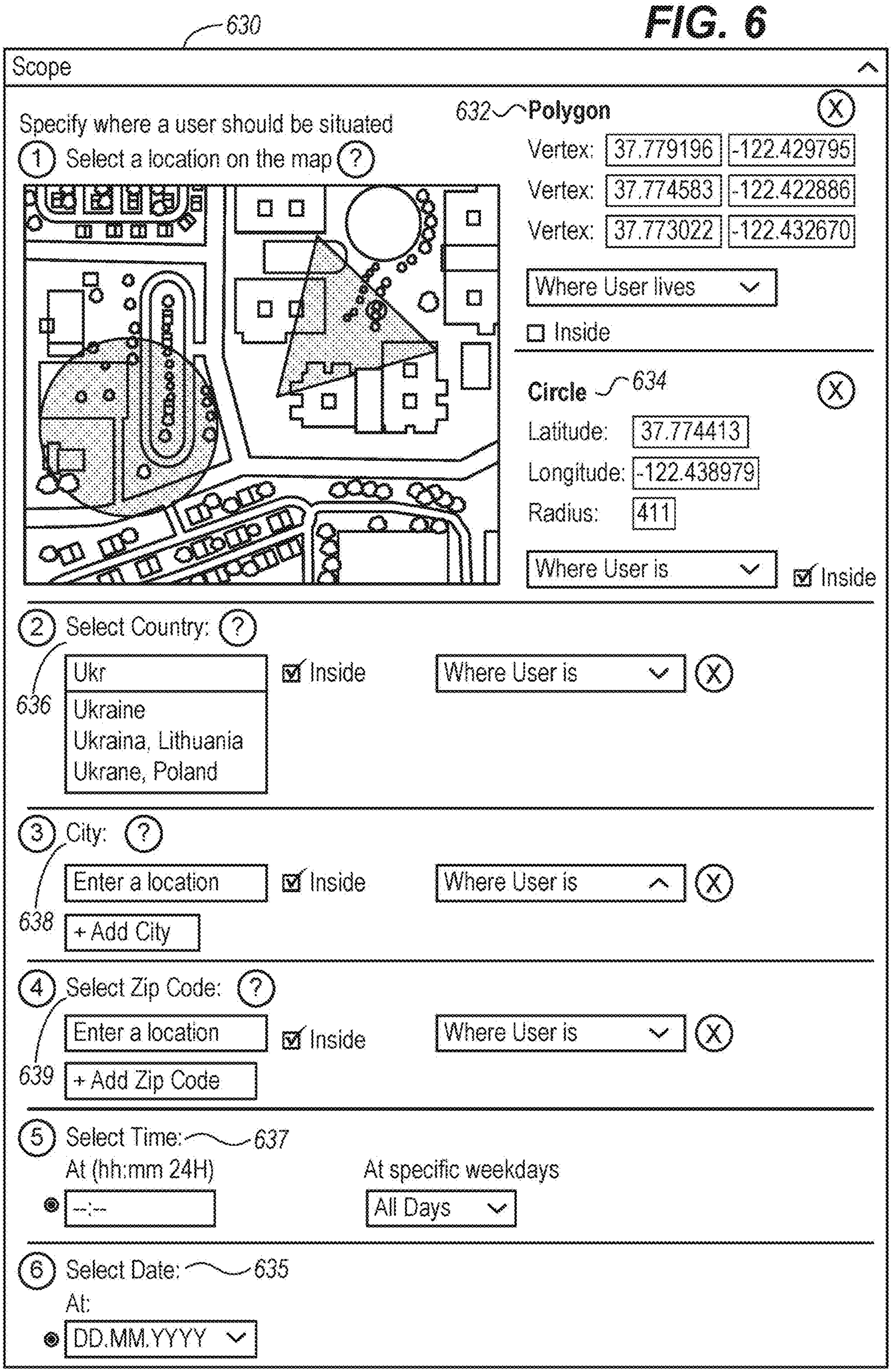
FIG. 6 shows an illustration of an exemplary UI for defining a scope of a campaign, in accordance with some exemplary embodiments of the disclosed subject matter.

Referring now to FIG. 6 showing an illustration of an exemplary UI for defining the scope of a campaign, in accordance with some exemplary embodiments of the disclosed subject matter. In some exemplary embodiments, Scope 630 of the campaign may correspond to Scope 330 (FIG. 3). In some exemplary embodiments, the administrative user may define a filter for Scope 630. In some exemplary embodiments, the filter may define a geographic area in which the campaign is configured to be activated, e.g., triggering campaign serving. In some exemplary embodiments, the Scope 630 may define a shape of a map area such as a Polygon 632 shape of a map, a Circle 634 shape of a map, or any other shape of a map. In some exemplary embodiments, the Scope 630 may define a Country 636 in which the campaign is configured to be active, a City 638 in which the campaign is configured to be active, a zip code 639 in which the campaign is configured to be active, or the like. For example, using City 638, the administrative user may define that the campaign is configured to be active only in Paris. In such a case, when the user is in Paris and one or the micro-moments of an activity node is complied with, content serving may be activated. In some exemplary embodiments, the Scope 630 may define a Timing Filter 637 defining one or more times of day, one or more days of the week, or any other timing filter, during which the campaign is configured to be active. In some exemplary embodiments, the Scope 630 may define a Date Filter 635 defining a specific week, a time frame between defined dates, or the like, during which the campaign is configured to be active.

Figure 7:
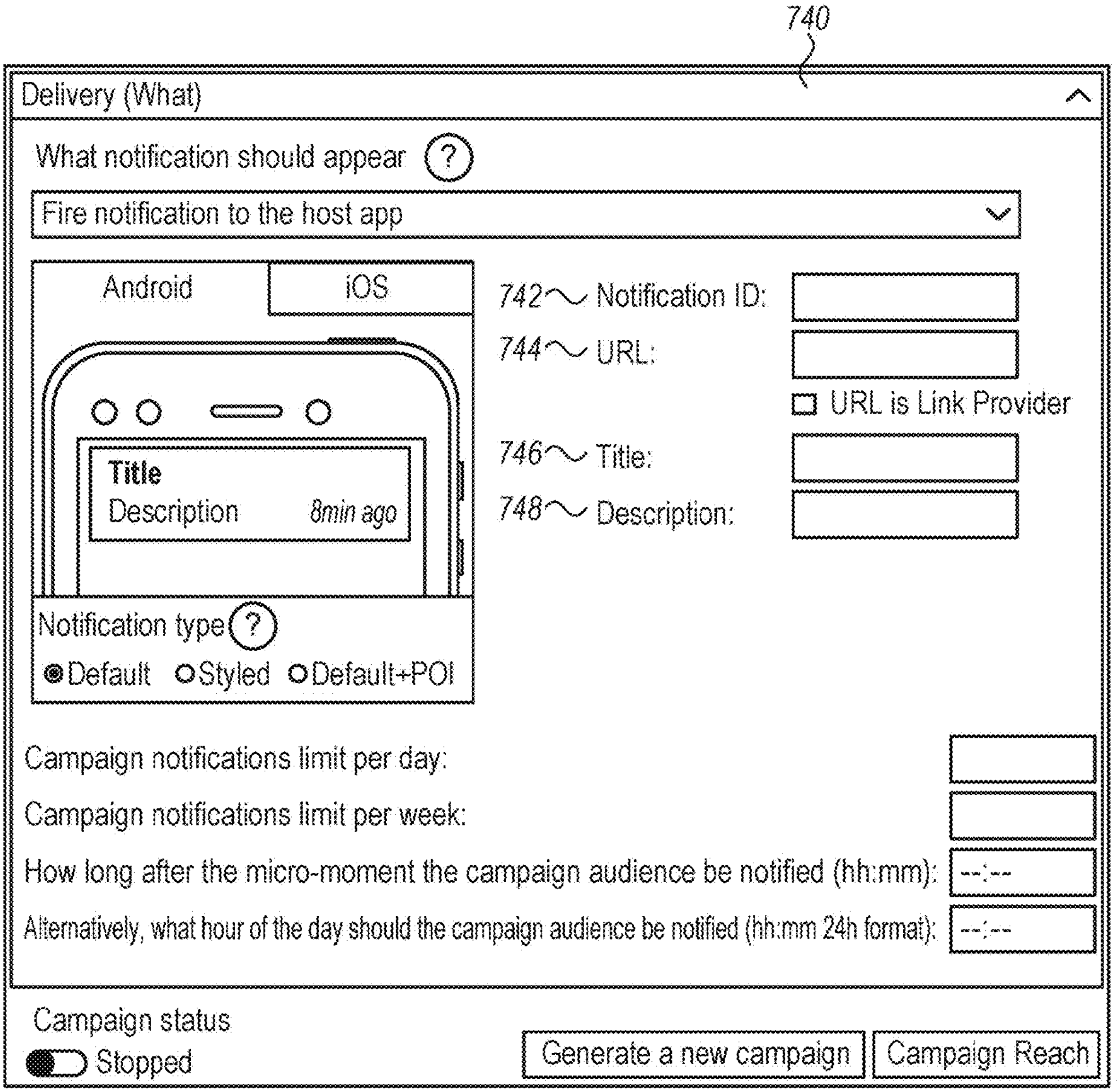
FIG. 7 shows an illustration of an exemplary UI for defining a content of a campaign delivery, in accordance with some exemplary embodiments of the disclosed subject matter.

Referring now to FIG. 7 showing an illustration of an exemplary UI for defining a content of a campaign delivery and timing thereof, in accordance with some exemplary embodiments of the disclosed subject matter. In some exemplary embodiments, Delivery 740 of the campaign may correspond to Delivery 340 (FIG. 3). In some exemplary embodiments, Delivery 740 may enable the administrative user to define the content items of the campaign. In some exemplary embodiments, a content item may be a notification issued to the end device. In some exemplary embodiments, the content item may be an e-mail, a notification, an SMS message, or the like.

In some exemplary embodiments, the administrative user may define a Notification Identifier 742 of a notification indicating or consisting of a unique identifier of the notification. In some exemplary embodiments, the administrative user may define a Link 744 of a content item, e.g., in a form of a Uniform Resource Locator (URL). In some exemplary embodiments, the administrative user may define a Title 746 of the notification. In some exemplary embodiments, the administrative user may define a Description 748 of a content item in the notification, e.g., including the text of the notification, media thereof, or the like. In some exemplary embodiments, the administrative user may define a time for displaying the notification, e.g., after a defined timeout from the micro-moment event invoking the notification, a time of day during which the notification should be provided after a micro-moment occurs, or the like. In some exemplary embodiments, the administrative user may define a limit on a number of notifications provided during a day or a week, a desired number of times they should be provided, or the like.

Figure 8:
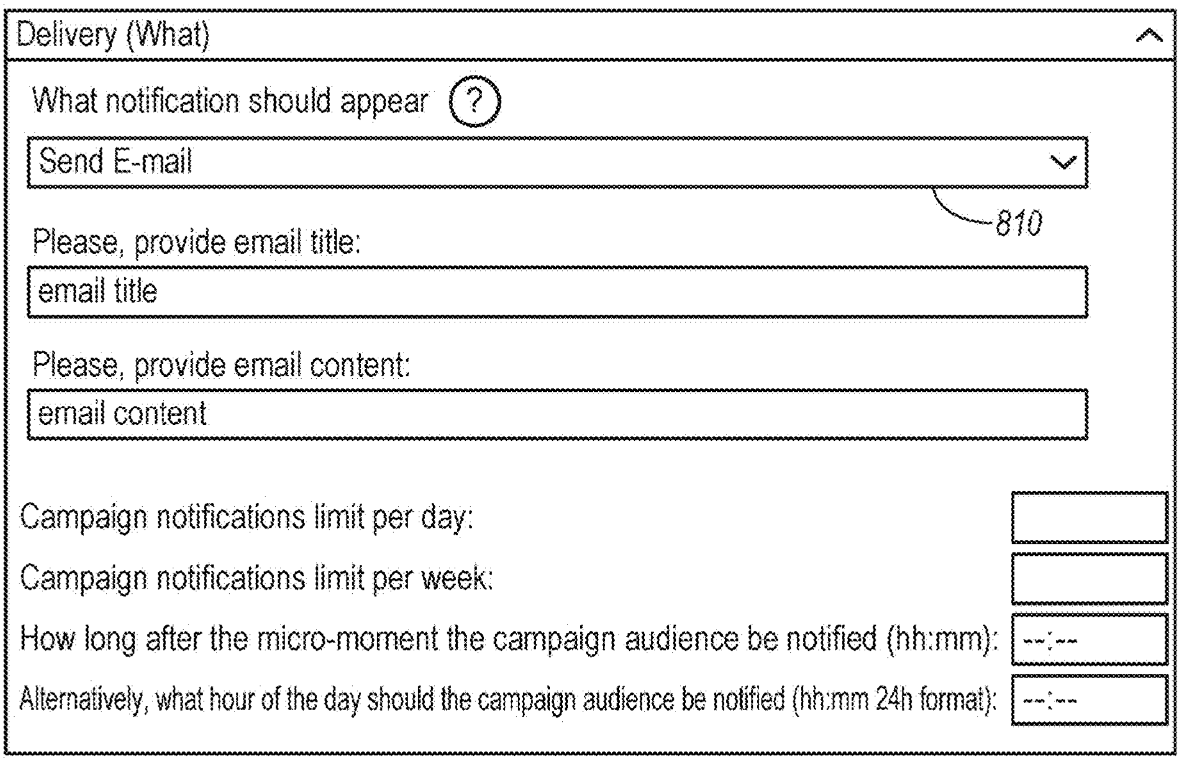
FIG. 8 shows an illustration of an exemplary content option, in accordance with some exemplary embodiments of the disclosed subject matter.

Referring now to FIG. 8 showing an illustration of an exemplary option of the content of delivery, in accordance with some exemplary embodiments of the disclosed subject matter. In some exemplary embodiments, the administrative user may select a Notification Type 810 from one or more notification types, such as sending a notification in a form of an e-mail.

Figure 9:
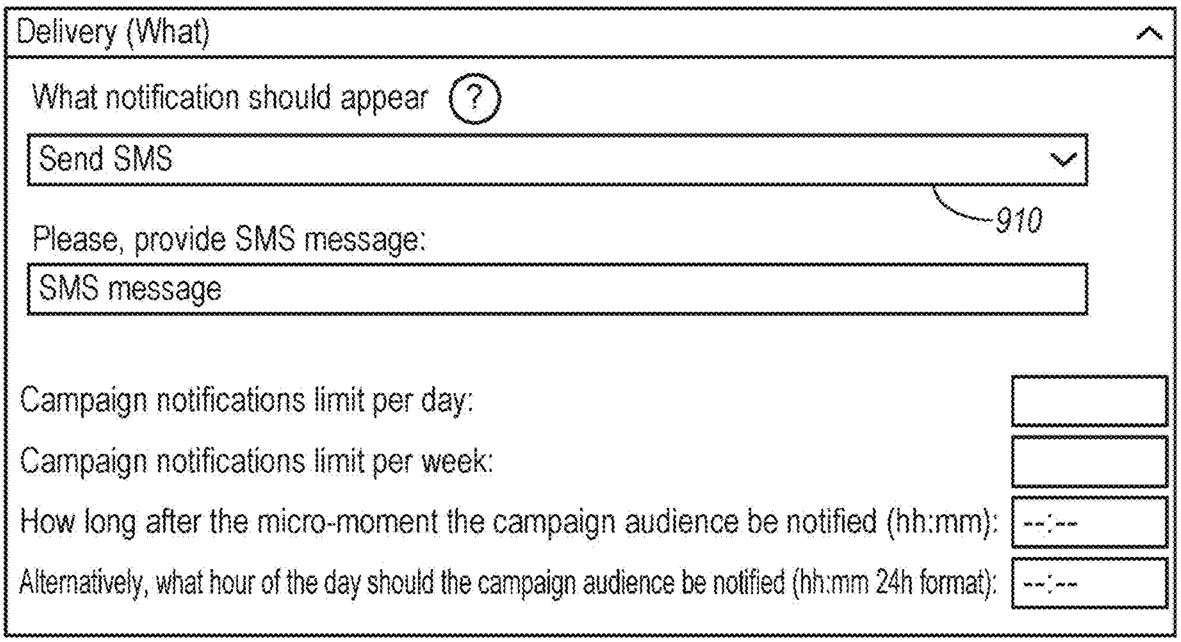
FIG. 9 shows an illustration of an exemplary content option, in accordance with some exemplary embodiments of the disclosed subject matter.

Referring now to FIG. 9 showing an illustration of an exemplary option of the content of delivery, in accordance with some exemplary embodiments of the disclosed subject matter. In some exemplary embodiments, the administrative user may select a Notification Type 810 from one or more notification types, such as sending a notification in a form of an SMS.

Figure 10:
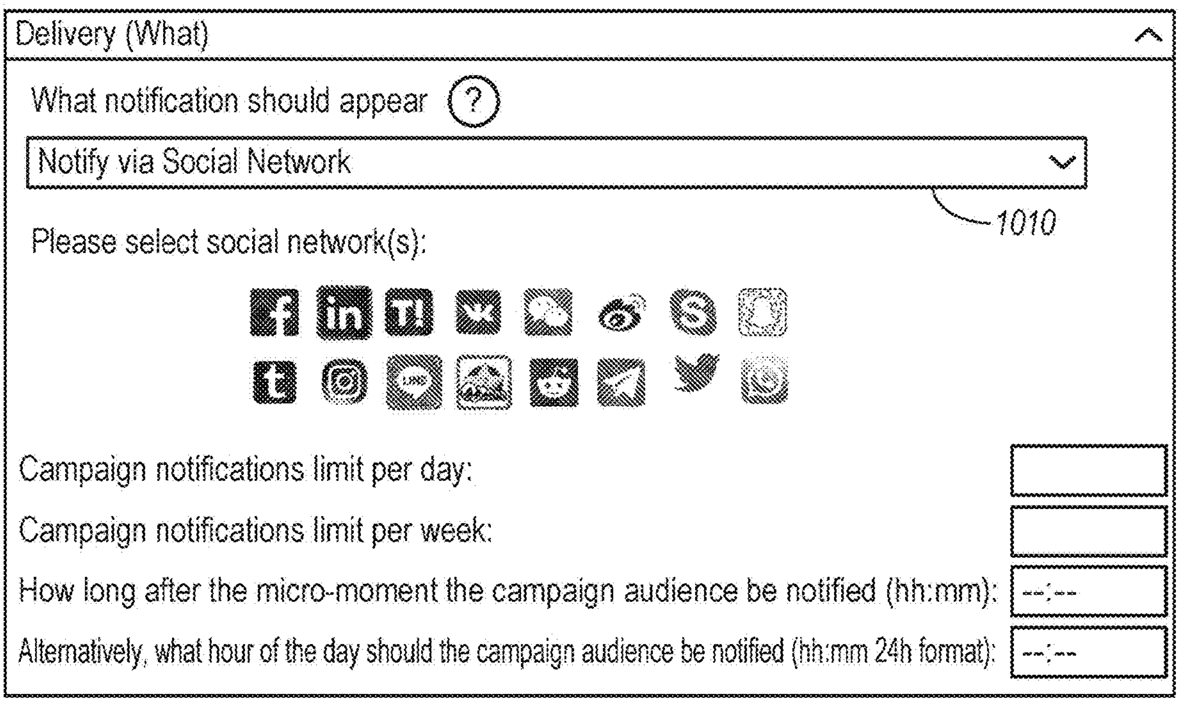
FIG. 10 shows an illustration of an exemplary content option, in accordance with some exemplary embodiments of the disclosed subject matter.

Referring now to FIG. 10 showing an illustration of an exemplary option of the content of delivery, in accordance with some exemplary embodiments of the disclosed subject matter. In some exemplary embodiments, the administrative user may select a Notification Type 810 from one or more notification types, such as providing a notification via a social media network, e.g., the host application.

It is noted that in some cases, instead of or in addition to a delivered content, the disclosed subject matter may be utilized to automate a procedure, a process, or the like. As an example, instead of delivering a notification, once the micro-moment (or a sequence of micro-moments) is identified for the relevant segment, a set of automated activities may be performed, such as activating IoT devices, transmitting emails, or the like.

Figure 11:
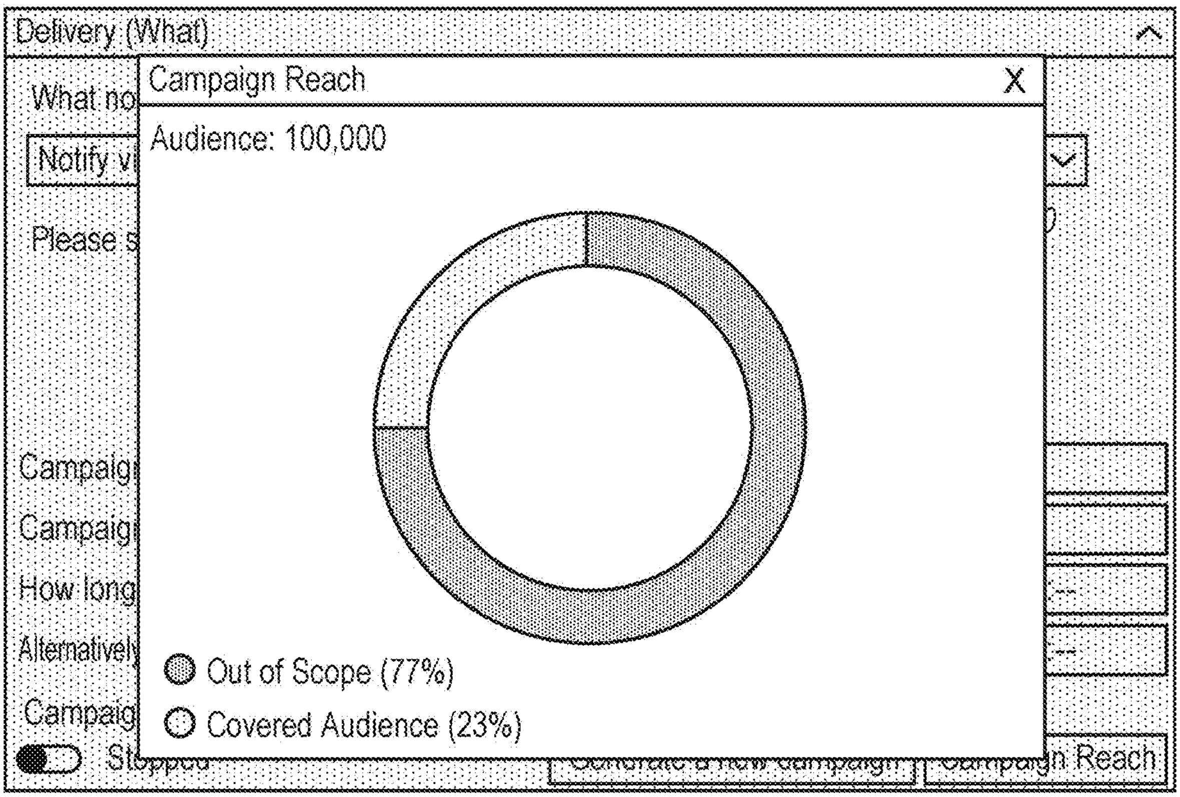
FIG. 11 shows an illustration of an exemplary reach analysis, in accordance with some exemplary embodiments of the disclosed subject matter.

Referring now to FIG. 11 showing an illustration of an exemplary reach analysis, in accordance with some exemplary embodiments of the disclosed subject matter. In some exemplary embodiments, reach analysis of a campaign may be performed. Reach analysis output is exemplified in FIG. 11, showing that a specific campaign is expected to disqualify 77% of the users in view of scope definitions, audience definitions, or the like.

Additionally, or alternatively, reach analysis may estimate a number of end-users that the campaign would reach, based on the definitions of the micro-segments and the volume of each micro-segment in the general audience. In some exemplary embodiments, a representative sample of users may be utilized in order to determine reach of the campaign. It may be determined what is the reach within the sample (e.g., 10 end users out of 10,000 users) and the total reach may be estimated based on the proportion of the sample with the general audience. It is noted that reach analysis may be performed in a centralized manner, if the server collects full information of at least the representative sample. Additionally, or alternatively, the reach analysis may be performed in a decentralized manner, by querying a sample of the end-devices to determine estimated outcome of serving the campaign to their users. In some exemplary embodiments, segment reach estimation may be performed based on a number of campaigns associated with target micro-segments that were requested by end devices.

In some exemplary embodiments, reach analysis can be performed to ensure that the selected micro-segments and micro-moments reach a big enough audience so that no personal information can be inferred from the results. In some cases, the reach analysis may consider micro-segmentation only, to determine whether a set of users defined based on operations on micro-segments is consists of PII data or not. As an example, a specific user may be identified as the only user being member of 1000 micro-segments. Hence, a campaign that targets such a user in a specific micro-moment may be used to track an individual user's activity and breach her privacy. The disclosed subject matter may utilize reach analysis to prevent execution of campaigns that target a small-scale audience, e.g. below a minimal threshold of 100 people, 1000 people, or the like.

Figure 12:
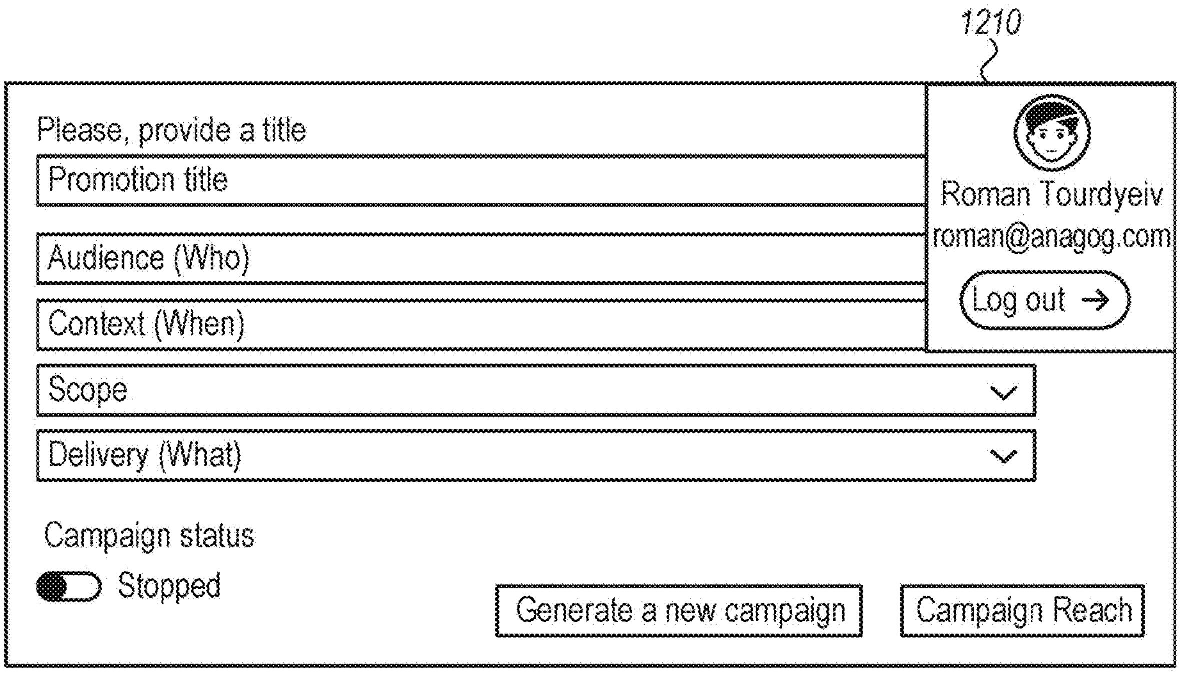
FIG. 12 shows an illustration of an administrative user of a campaign, in accordance with some exemplary embodiments of the disclosed subject matter.

Referring now to FIG. 12 illustrates an administrative user of a campaign, in accordance with some exemplary embodiments of the disclosed subject matter. In some exemplary embodiments, a specific Administrative User 1210 may be defined for each campaign. Administrative User 1210 may represent a client generating a campaign. Administrative User 1210 may log into or log out of the system of the campaign providing entity.

Figure 13:
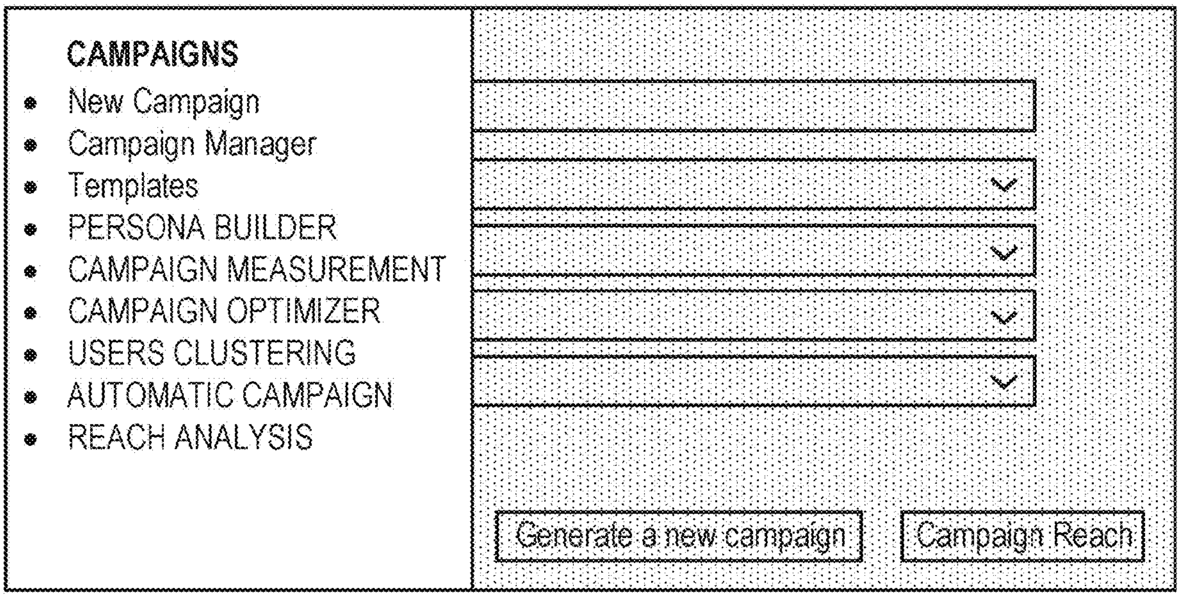
FIG. 13 shows an illustration of a UI of a campaign building platform, in accordance with some exemplary embodiments of the disclosed subject matter.

Referring now to FIG. 13 illustrates a UI of a campaign building platform, in accordance with some exemplary embodiments of the disclosed subject matter. FIG. 13 illustrates a UI showing a list or menu of different options provided to a client. In some exemplary embodiments, the options may include starting a new campaign, managing an existing campaign of the client, using templates of campaign content, creating a persona of interest using a Persona Builder (FIG. 15), measuring a campaign using a Campaign Measurement UI (FIG. 16), optimizing a campaign using Campaign Optimizer (FIG. 17), identifying clusters of end users using Users Clustering (FIG. 18), automating a campaign, and performing a reach analysis using a Reach Analysis UI (FIG. 11).

Figure 14:
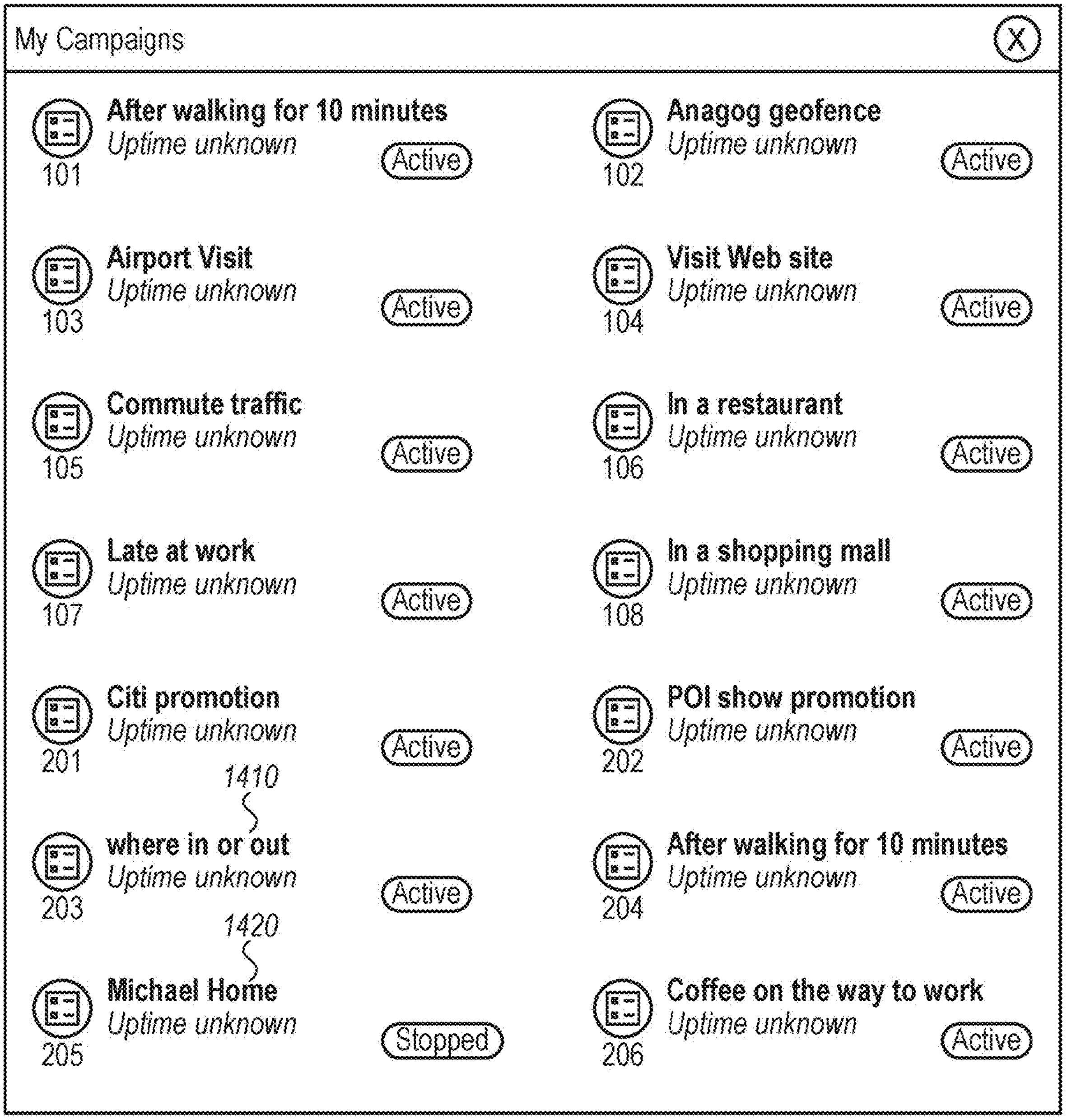
FIG. 14 shows an illustration of a UI of a campaign building platform, in accordance with some exemplary embodiments of the disclosed subject matter.

Referring now to FIG. 14 illustrates an exemplified UI of a campaign building platform, in accordance with some exemplary embodiments of the disclosed subject matter. In some exemplary embodiments, the UI may present to the administrative user active and non-active micro-moments of the campaign. For example, as illustrated in FIG. 14, Micro-Moment 1410, identifying whether the user is located outdoors or indoors, is active, while Micro-Moment 1420 is not active.

In some exemplary embodiments, micro-moments that are active may cause content serving when they occur, while micro-moments that are inactive may not cause content serving to the user.

Referring now to FIG. 15 illustrates an exemplified UI of a persona building platform, in accordance with some exemplary embodiments of the disclosed subject matter. In some exemplary embodiments, during definition of the campaign's audience, one or more personas may be defined using combinations of micro-segments, proprietary micro-segments, or the like.

In some exemplary embodiments, as illustrated in FIG. 15, an administrative user may create a persona by filling in a persona form including a persona title and a selection of micro-segments of choice. In some exemplary embodiments, the micro-segments may include Micro-Segments 1510 defined by the campaign building platform, e.g., the campaign provider. For example, Micro-Segments 1510 may include offline-based micro-segments such as average durations of visits of the user in selected brand stores, a home to work commute time in a timeframe such as the last three days, a user that usually enters home after work in Sunday, or any other micro-segment that defines or describes the desired persona activity patterns based on online or offline user information.

In some exemplary embodiments, the micro-segments may include Proprietary Micro-Segments 1520, which may be defined by a client in addition to Micro-Segments 1510, e.g., using one or more segments and user profiles of the client. For example, Proprietary Micro-Segments 1520 may include utilizing an online-based user database of a client to target additional segments of users, e.g., targeting users based on credit card transactions that are available to the client. In some exemplary embodiments, Proprietary Micro-Segments 1520 and Micro-Segments 1510 may correspond to Proprietary Micro-Segments 414 and Micro-Segments 412 (FIG. 4), respectively.

Figure 16:
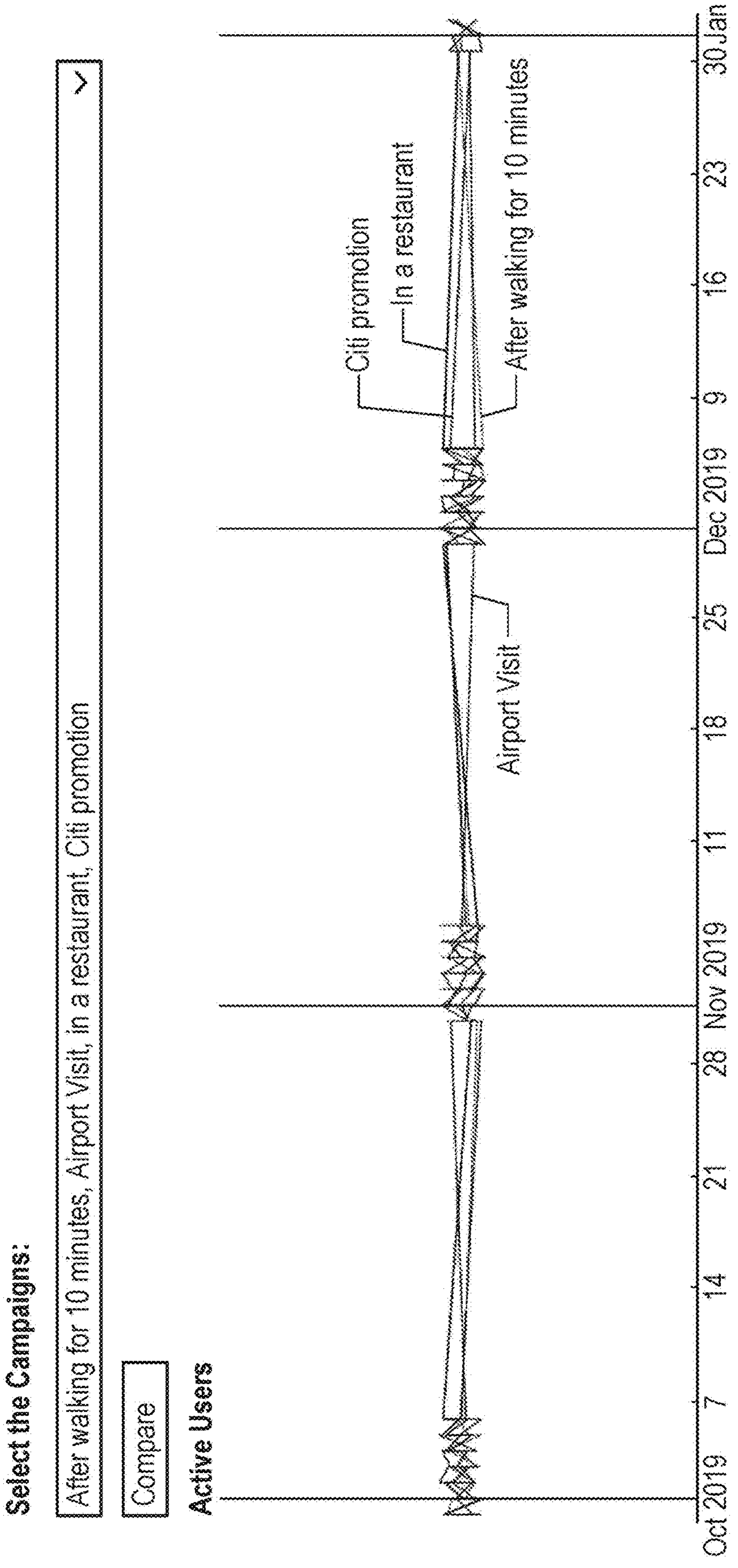
FIG. 16 shows a representation of exemplified campaign statistics over time, in accordance with some exemplary embodiments of the disclosed subject matter.

Referring now to FIG. 16 illustrates a representation of exemplified campaign statistics over time, in accordance with some exemplary embodiments of the disclosed subject matter. As illustrate by FIG. 16, a client may be provided with statistical information, e.g., a visual cue thereof, indicating for each micro-moment of the campaign a count of active users that interacted with the campaign in response to content serving triggered by the micro moment. The micro-moments may consist of micro-moments such as "after walking for 10 minutes", "at an airport visit", "in a restaurant", or the like. The administrative user may select a timeframe for viewing the result statistics for each micro-moment, and determine based on the presented statistics which micro-moments are more successful than others, less successful, or the like. In some exemplary embodiments, the timeframe may consist of one or more days, weeks, months, an entire time of the campaign, or the like.

Figure 17:
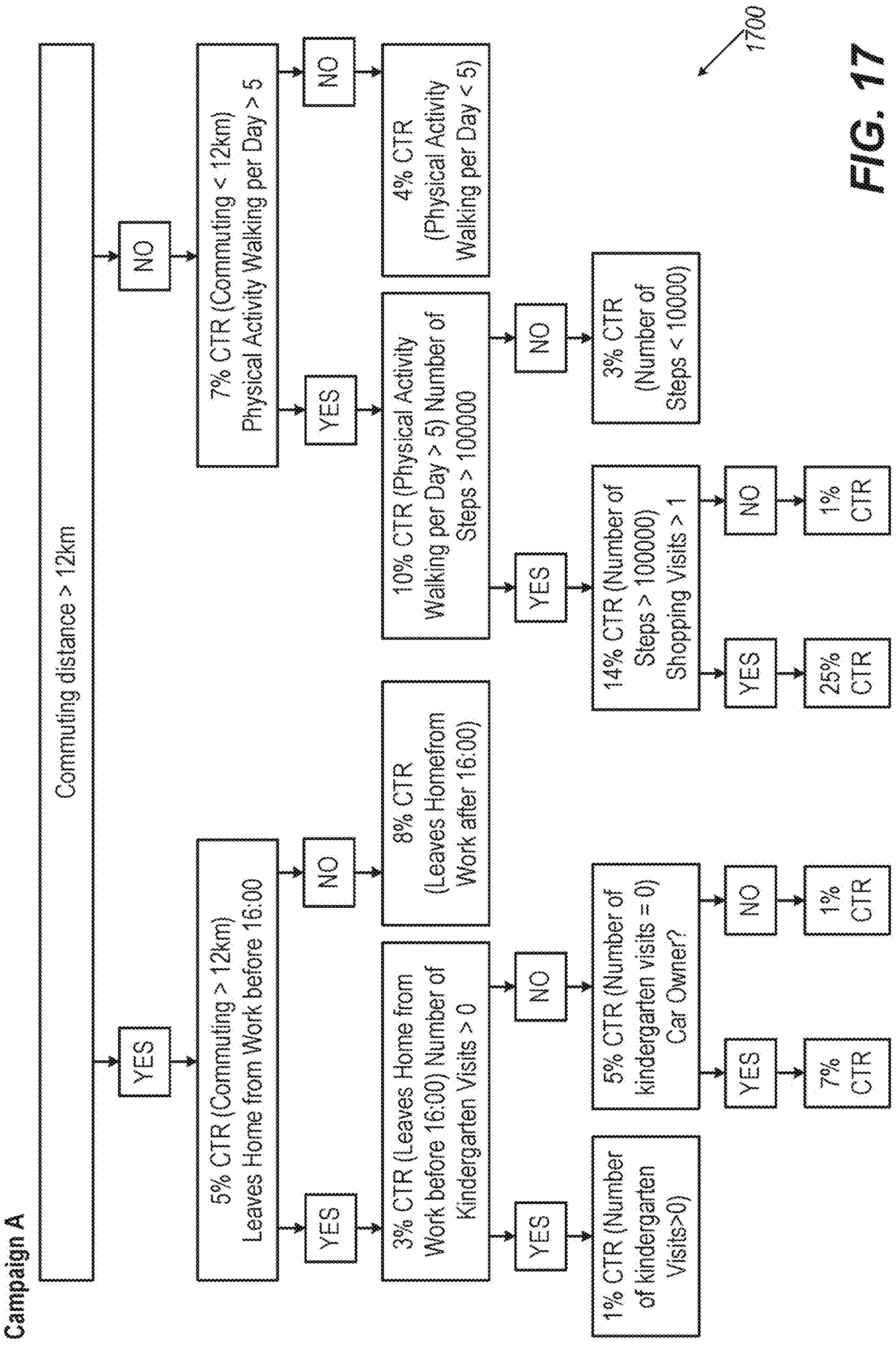
FIG. 17 shows an exemplified UI of a campaign optimizer, in accordance with some exemplary embodiments of the disclosed subject matter.

Referring now to FIG. 17 illustrates an exemplified UI of a campaign optimizer, in accordance with some exemplary embodiments of the disclosed subject matter. In some exemplary embodiments, Campaign Optimizer 1700 may be configured to optimize a campaign, by enabling to analyze success rates of segments and focus on the segments that provide better results. In some exemplary embodiments, Campaign Optimizer 1700 indicates different CTRs or any other measurement that were received for different micro-segments or micro-moments, e.g., via a decision tree.

In the illustrated example of FIG. 17, a first segmentation is based on whether or not the users are in a micro-segment of "commuting distance>12 km". Users in the micro-segment exhibit 5% CTR, while users not in this micro-segment exhibit 7% CTR. For users in the micro-segment, it is determined that if they are also members of the micro-segment of people that leave home from work before 16:00—those that are, exhibit a reduced CTR of 3%, while those that are not, exhibit an increased CTR of 8%. As a result, users of micro-segment of "commuting distance >12 km, leave home from work after 16:00" are recognized as more prone to convert, with an 8% CTR. As is illustrated, the optimization may determine that the micro-segment of "commuting distance <12 km, Physical Activity Walking per Day >5, Number of Steps >10,000, and Shopping Visits >1" are the most prone to convert, with a CTR of 25%. Accordingly, an administrative user may target such specific micro-segment for his campaign. Additionally, or alternatively, automated targeting of such micro-segment may be implemented, e.g., iteratively. In some exemplary embodiments, the disclosed subject matter may implement targeting of such micro-segments as a semi-automated optimization procedure, where a suggestion is automatically provided, and the administrative user may accept, decline or modify the suggested targeting parameters.

Figure 18:
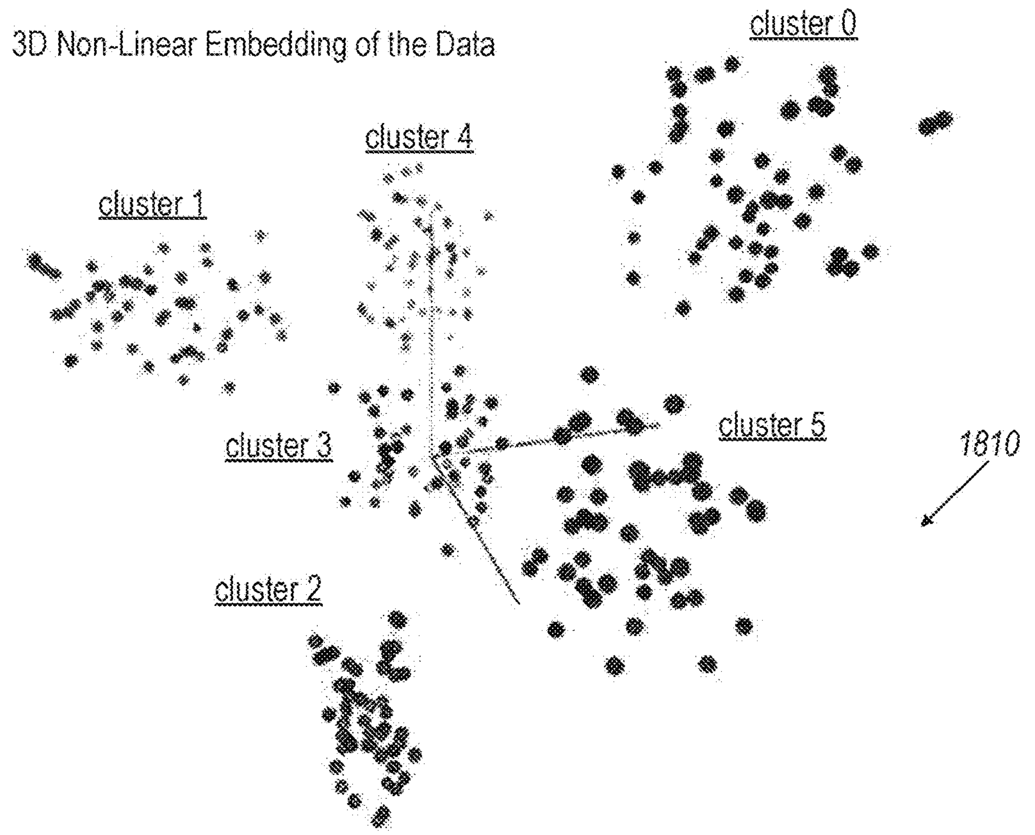
FIG. 18 shows an exemplified representation of a user cluster, in accordance with some exemplary embodiments of the disclosed subject matter.
Figure 18:
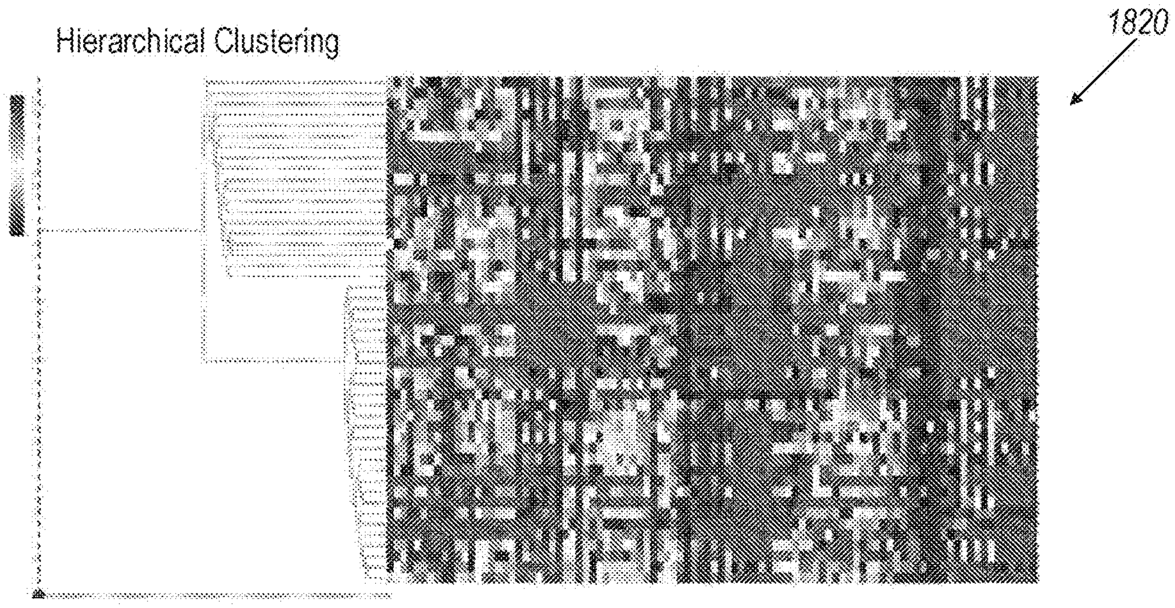

Referring now to FIG. 18 illustrates an exemplified representation of a user cluster, in accordance with some exemplary embodiments of the disclosed subject matter.

In some exemplary embodiments, as indicated by the UI, the user clusters according to their micro-segments are presented, e.g., using one or more cluster processing techniques. In some exemplary embodiments, the user clusters may be processed to display a Three-Dimensional Non-Linear Embedding 1810 of the data. In some exemplary embodiments, the user clusters may be processed to display a Hierarchical Clustering 1820 of the data. Any other technique for clustering, representing or processing the user data may be utilizing.

As an example, if there are 100 micro-segments, all the users can be represented in a 100 dimensions space, depending on their value of each micro-segment. A clustering algorithm may attempt to separate the users to groups and also represent the groups in a lower dimension by applying dimensionality reduction. Using those clusters it is possible to check if different clusters engage differently and have different behavioral features, such as a different CTR to a same campaign, a different triggering event to be used as a relevant micro-moment that triggers serving of the campaign content, or the like. In some cases, different clusters may be handled differently.

In some cases, based on the identified user clusters, an administrative user may be enabled to define different behaviors of content serving for the different clusters. In some exemplary embodiments, the clusters may be utilized to define initial range of micro-segments for the sake of automated campaign generation.

Figure 19:
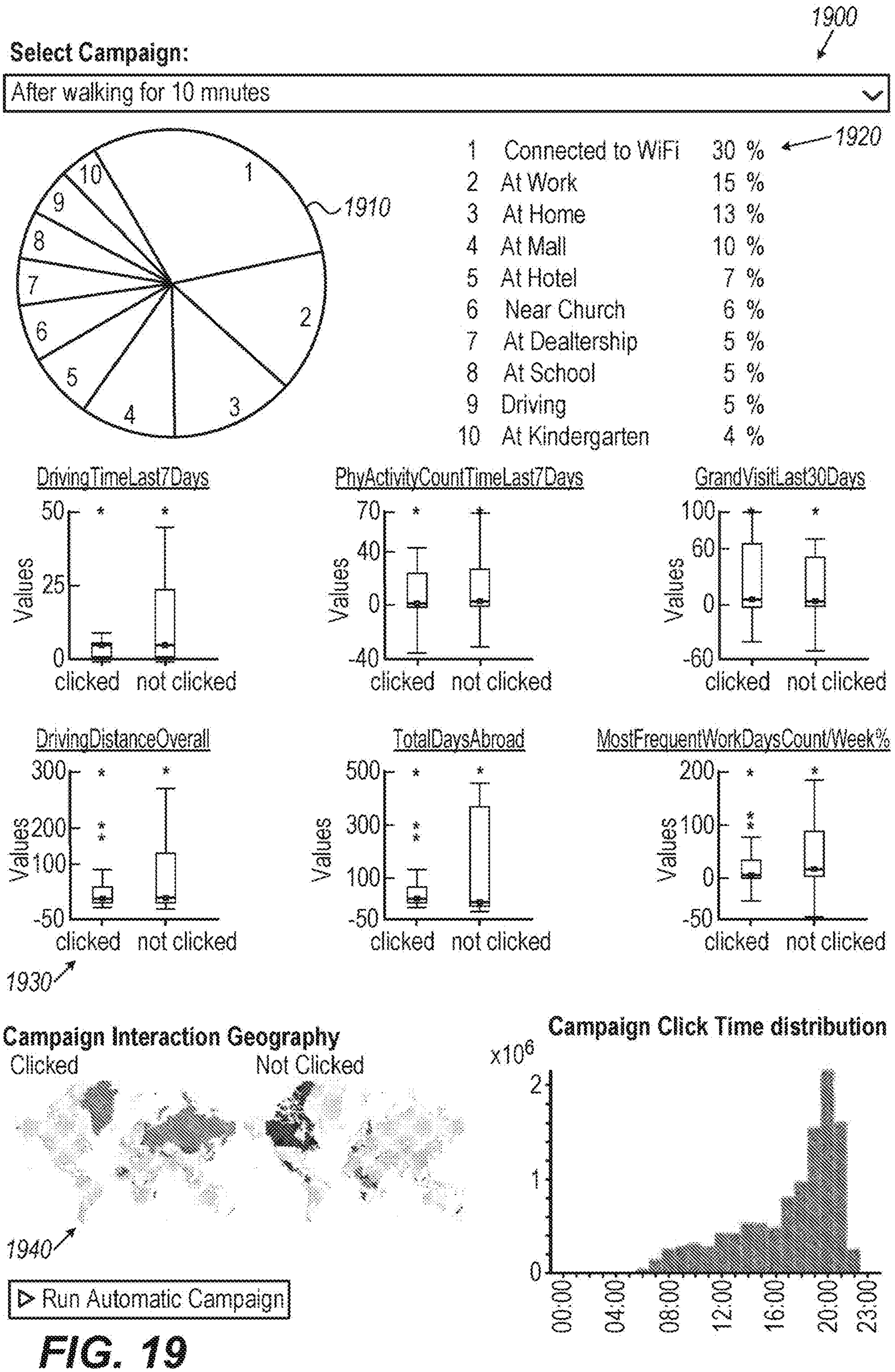
FIG. 19 shows a representation of exemplified campaign statistics, in accordance with some exemplary embodiments of the disclosed subject matter.

Referring now to FIG. 19 illustrates a representation of exemplified campaign statistics, in accordance with some exemplary embodiments of the disclosed subject matter. In some exemplary embodiments, the UI illustrates analytical information regarding a campaign. In some exemplary embodiments, the measurements may be computed at a server without mobile devices divulging PII data to the server.

In some exemplary embodiments, UI 1900 may consist of an exemplified UI of campaign statistics. In some exemplary embodiments, upon completing one or more stages of a campaigning, or serving the campaign for a certain time-frame, statistical results may be computed and presented to an administrative user, or used for enhancing the campaign using an automatic campaign.

In some exemplary embodiments, UI 1900 of the automatic campaign illustrates micro-moments of end users that interacted with the campaign (e.g., 30% were "connected to WIFI", 10% were "at mall", 5% were "at dealership", 5% were "at school", 15% were "at work", 5% were "driving", etc.). In some cases, a Top-Most Set 1920 of micro-moments may be displayed, a Pie Chart 1910 may display the proportion of each micro-moment in the relevant interactions, or any other method of representing the data may be utilized.

In some exemplary embodiments, UI 1900 may illustrate significant Micro-Segments 1930, e.g., the top most significant Micro-Segments 1930. As can be seen, "Driving Time Last 7 Days" shows a statistically different distribution of the clicked sample than the not clicked sample. Similarly, the following micro-segments also exhibit a significant statistical difference between clicked and not clicked populations: physical activity count in the last 7 days, brand visits last 30 days, driving distance overall, total days abroad, etc.

In some exemplary embodiments, UI 1900 may illustrate top most significant Scope 1940. In some exemplary embodiments, Scope 1940 may include scope-related information, such as geographic location of users that interacted with the campaign and of users that did not interact with the campaign, click time interactions, or the like.

In some exemplary embodiments, the administrative user may decide to define a campaign manually based on the insights provided by UI 1900. Additionally, or alternatively, the administrative user may select "run automatic campaign" to create a campaign in an automated manner based on the information gathered and displayed. In some exemplary embodiments, during an automated campaign, a campaign may be randomly served to a sample of users. All user interactions with the campaign may be reported back to the server, together with relevant micro-moments of the users that interacted with the campaign. For each user who was served content items of the campaign, the respective end device may report whether she interacted with the content items and if so, which micro-moments were active when the user interaction occurred, to which micro-segments the user belongs, or the like.

Figure 20:
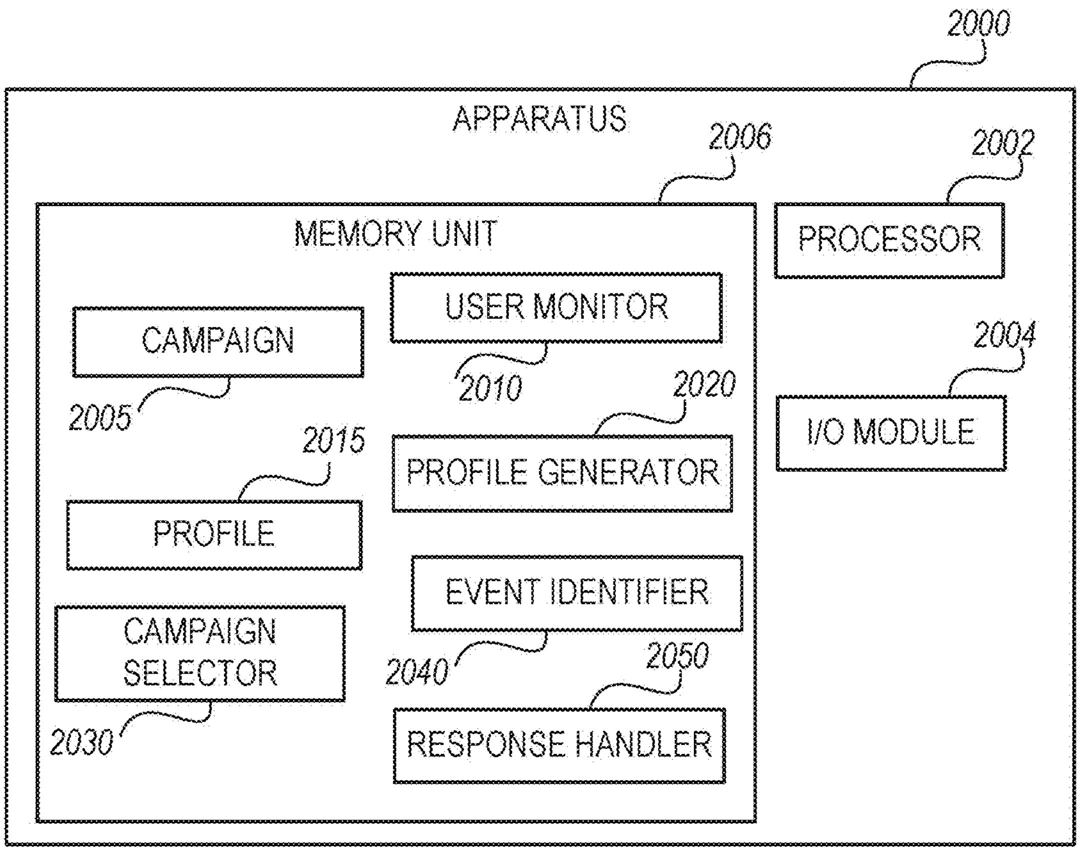
FIG. 20 shows a block diagram of an apparatus, in accordance with some exemplary embodiments of the disclosed subject matter.

Referring now to FIG. 20, showing an apparatus in accordance with some exemplary embodiments of the disclosed subject matter.

In some exemplary embodiments, Apparatus 2000 may be comprised in a client device, such as Client Device 110 of FIG. 1. In some exemplary embodiments, Apparatus 2000 may comprise one or more Processor(s) 2002, an Input/Output (I/O) Module 2004, a Memory Unit 2006, or the like.

In some exemplary embodiments, Processor 2002 may be a Central Processing Unit (CPU), a Graphical Processing Unit (GPU), a microprocessor, an electronic circuit, an Integrated Circuit (IC) or the like. Processor 2002 may be utilized to perform computations required by Apparatus 2000 or any of its subcomponents.

In some exemplary embodiments, Apparatus 2000 may comprise an Input/Output (I/O) Module 2004. I/O Module 2004 may be utilized to communicate with other computerized devices, such as Server 120 of FIG. 1, or the like, to obtain an Agent 2005, to notify the server of failed testing, or the like.

In some exemplary embodiments, Apparatus 2000 may comprise Memory Unit 2006. Memory Unit 2006 may be a hard disk drive, a Flash disk, a Random Access Memory (RAM), a memory chip, or the like. In some exemplary embodiments, Memory Unit 2006 may retain program code operative to cause Processor 2002 to perform acts associated with any of the subcomponents of Apparatus 2000.

Memory Unit 2006 may be utilized to retain a user Profile 2015, which may comprise one or more attributes of the user, micro-segments of the user, identified timing information of the user, user activities identified, patterns of the user activities, a combination thereof, or the like.

Memory Unit 2006 may be utilized to retain a Campaign 2005, comprising one or more campaigns. A Campaign 2005 may be targeted to one or more user attributes, micro-moments, or the like, determined automatically or manually at a campaign providing entity. Campaign 2005 may comprise one or more content items to be presented to a user of an end device consisting of Apparatus 2000, and one or more rules regarding a manner or presenting the content items, events that are to trigger content serving, or the like. In case of lazy fetching, Campaign 2005 may initially retain only the one or more rules, and upon identifying a trigger to serve a content item, the content item may be obtained and retained in Campaign 2005.

Memory Unit 2006 may comprise one or more components as detailed below, implemented as executables, libraries, static libraries, functions, or any other executable components.

Memory Unit 2006 may comprise User Monitor 2010. User Monitor 2010 may be configured to monitor one or more offline sensors of the user, one or more online sensors of the user, or the like. User Monitor 2010 may identify one or more online activities of the user, one or more offline activities of the user, or the like.

Memory Unit 2006 may comprise Profile Generator 2020. Profile Generator 2020 may be configured to generate or modify Profile 2015 of the user, based on monitored user data obtained from User Monitor 2010. Profile Generator 2020 may utilize, in addition to the monitored user data, one or more third-party profiling information associated with the user.

Memory Unit 2006 may comprise Campaign Selector 2030. Campaign Selector 2030 may be configured to select one or more campaigns, e.g., Campaign 2005, for the user based on Profile 2015 of the user. Campaign Selector 2030 may select one or more Campaigns 2005 that are estimated to match the user's interests, that correspond to micro-segments and/or micro-moments that are targeted by a campaign, that are estimated to be successful, or the like.

Memory Unit 2006 may comprise Event Identifier 2040. Event Identifier 2040 may be configured to obtain accumulated user data from User Monitor 2010, and identify based on the data, whether or not one or more rules of Campaign 2005 are complied with. Upon identifying that a rule is complied with, Event Identifier 2040 may notify Response Handler 2050.

Response Handler 2050 may be configured to perform one or more responsive actions in response to identifying an event. Response Handler 2050 may perform content serving itself, or instruct one or more host application to perform the content serving. In case of lazy fetching, Response Handler 2050 may identify whether the desired item is located in Campaign 2005. In case the desired item is not located in Campaign 2005, Response Handler 2050 may request the content item from the server.

In some exemplary embodiments, a software agent consisting of an SDK with an API may comprise User Monitor 2010, Profile Generator 2020, Campaign Selector 2030, Event Identifier 2040, Response Handler 2050, or the like. In some exemplary embodiments, the software agent may be associated with a marketing system, a client of a marketing system, or the like, and may or may not be embedded in a host application.

The disclosed subject matter may be a system, a method, and/or a computer program product. The computer program product may include a computer readable storage medium (or media) having computer readable program instructions thereon for causing a processor to carry out aspects of the disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the disclosed subject matter.

Aspects of the disclosed subject matter are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosed subject matter has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary 10 skill in the art to understand the invention for various embodiments with various modifications as are suited to the particular use contemplated.

What is claimed is:

1. A privacy-preserving method implemented at an end device, the method comprising:

obtaining Personally Identifiable Information (PII) data of a user of the end device, wherein the PII data is based on information obtained by monitoring the user using the end device, wherein the PII data represents activities of the user, wherein a privacy of the user is violated if the PII data is divulged to any device external to the end device;

based on the PII data, generating, at the end device, a user profile, wherein the user profile indicates that the user of the end device matches at least one population segment, wherein the at least one population segment comprises a defined frequency of a user activity indicated by the PII data;

communicating with a server for receiving a set of one or more campaigns retained at the server, selecting a campaign from the one or more campaigns, wherein the campaign comprises one or more executable rules for displaying at least one content item, wherein said selecting is based on the campaign being designated for the at least one population segment, wherein said selecting is performed by the end device without the end device providing any of the PII data to the server, thereby preserving the privacy of the user;

monitoring, at the end device, real time user activities of the user; and upon identifying, based on the real time user activities, that a rule of the one or more executable rules for displaying the content item is complied with, displaying the content item in the end device.

2. The method of claim 1, further comprising:

monitoring, at the end device, one or more interactions of the user with the content item;

computing, at the end device, a count of interactions of each interaction type between the user and the content item; and providing the count of interactions of each interaction type to the server.

3. The method of claim 2, wherein said monitoring the one or more interactions comprises obtaining an indication of the one or more interactions from a host application of the end device that displays the content item.

4. The method of claim 2, wherein said monitoring the one or more interactions comprises:

monitoring a background and a foreground of the end device, and determining that an interaction of the one or more interactions has occurred based on identifying that a notification presenting the content item is in a foreground of the end device.

5. The method of claim 1, wherein said displaying the content item in the end device comprises instructing a host application to display the content item.

6. The method of claim 1, further comprising triggering content serving when the user is not interacting with the end device.

7. The method of claim 1, further comprising modifying a delivery of the content item based on the real time user activities.

8. The method of claim 1, further comprising obtaining profile information of the user from a third party, and generating the user profile based on the profile information.

9. The method of claim 8, further comprising obtaining an identifier of the profile information from a host application of the end device, and utilizing the identifier to extract the profile information from the third party.

10. The method of claim 1, further comprising:

obtaining online user information of the user, wherein the online information comprises user communications that utilize a network medium, and wherein said generating the user profile is based on the online user information.

11. The method of claim 1, wherein the PII data is obtained using one or more offline sensors monitoring activity of the user at the end device.

12. The method of claim 11, wherein the one or more offline sensors comprise a sensor selected from the group consisting of:

a location sensor;

a camera;

a gyroscope;

a proximity sensor;

an ambient light sensor;

a microphone; and
an accelerometer.

13. The method of claim 1, wherein the PII data represents at least in part locations of the user over time.

14. The method of claim 1, wherein the end device is a computer selected from the group consisting of a laptop computer, a tablet computer, and a mobile phone.

15. A system comprising:
an end device that comprises a processor and a memory;
a server;
wherein said processor being adapted to:
obtain Personally Identifiable Information (PII) data of a user of the end device, wherein the PII data is based on information obtained by monitoring the user using the end device, wherein the PII data represents activities of the user, wherein a privacy of the user is violated if the PII data is divulged to any device external to the end device;
based on the PII data, generate, at the end device, a user profile, wherein the user profile indicates that the user of the end device matches at least one population segment, wherein the at least one population segment comprises a defined frequency of a user activity indicated by the PII data;
communicate with said server to receive a set of one or more campaigns retained at the server;
select a campaign from the one or more campaigns, wherein the campaign comprises one or more executable rules for displaying at least one content item, wherein said selecting is based on the campaign being designated for the at least one population segment, wherein said selecting is performed by the end device without the end device providing any of the PII data to the server, thereby preserving the privacy of the user;
monitor, at the end device, real time user activities of the user; and
upon identifying, based on the real time user activities, that a rule of the one or more executable rules for displaying a content item is complied with, display the content item in the end device.

16. The system of claim 15, wherein the processor is adapted to:
monitor, at the end device, one or more interactions of the user with the content item;
compute, at the end device, a count of interactions of each interaction type between the user and the content item; and
provide the count of interactions of each interaction type to the server.

17. The system of claim 15, wherein said end device comprises a sensor, wherein said end device utilizes said sensor to monitor user activities, thereby obtaining the PII data.

18. The system of claim 15, wherein the user profile is based on a combination of online user information and offline user information, wherein the online user information comprises user communications that utilize a network medium.

19. A server comprising:
a database of one or more campaigns, wherein each campaign of the one or more campaigns comprises one or more executable rules for displaying at least one content item, wherein the each campaign is designated for a population segment, the population segment is defined based on a defined frequency of a user activity;
a network connection configured to enable communication of said server with a plurality of end devices;
wherein said server is configured to distribute the one or more campaigns or portion thereof to each of the plurality of end devices,
wherein each end device of the plurality of end devices is configured to collect Personally Identifiable Information (PII) data of a respective user of the each end device, wherein the PII data is based on information obtained by monitoring real time user activities of the user using the end device, wherein a privacy of the user is violated if the PII data is divulged to any device external to the end device;
wherein said server is configured to receive reports from the plurality of end devices, wherein the reports indicate which content items were presented in each of the plurality of end devices and statistical information regarding the interactions, wherein the reports do not violate a privacy of users of the plurality of end devices.

* * * * *